(12) United States Patent
Ohishi et al.

(10) Patent No.: US 6,641,267 B2
(45) Date of Patent: Nov. 4, 2003

(54) PROJECTION TYPE DISPLAY APPARATUS

(75) Inventors: Mineo Ohishi, Saitama (JP); Koji Okamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/073,773

(22) Filed: Feb. 11, 2002

(65) Prior Publication Data

US 2002/0163627 A1 Nov. 7, 2002

(30) Foreign Application Priority Data

Feb. 15, 2001 (JP) .......................................... 2001-038410
Feb. 15, 2001 (JP) .......................................... 2001-038411

(51) Int. Cl.[7] ............................................... G03B 21/16
(52) U.S. Cl. ............................. 353/61; 353/119; 353/58
(58) Field of Search ............................... 353/52, 57, 58, 353/61, 60, 53, 55, 56, 119, 121, 122

(56) References Cited

U.S. PATENT DOCUMENTS

| | | | | |
|---|---|---|---|---|
| 3,610,747 A | * | 10/1971 | Bickel ............................ | 353/61 |
| 4,682,868 A | * | 7/1987 | Constantin et al. ............ | 353/58 |
| 6,007,205 A | * | 12/1999 | Fujimori ........................ | 353/57 |
| 6,111,630 A | * | 8/2000 | Watanuki et al. ............. | 349/161 |
| 6,290,360 B1 | * | 9/2001 | Konuma et al. .............. | 353/61 |
| 6,334,686 B1 | * | 1/2002 | Shiraishi et al. .............. | 353/57 |
| 6,350,033 B1 | * | 2/2002 | Fujimori ........................ | 353/61 |
| 6,422,703 B1 | * | 7/2002 | Wang et al. ................... | 353/61 |
| 2002/0067469 A1 | * | 6/2002 | Eguchi et al. ................. | 353/31 |

* cited by examiner

Primary Examiner—Russell Adams
Assistant Examiner—Andrew Sever
(74) Attorney, Agent, or Firm—Jay H. Maioli

(57) ABSTRACT

A projection type display apparatus wherein heat generated from a plurality of heat sources in an outer housing is exhausted efficiently and the weight of the outer housing is balanced. A projection lens is disposed centrally in a front wall of the outer housing, and first and second exhaust mechanisms including first and second exhaust fans for exhausting heat generated by a light source section in the outer housing and a setting power supply circuit board and a light source section power supply circuit board that serve as independent power sections are respectively disposed on left and right sides of the optical unit in the outer housing. First and second exhaust ports of the first and second exhaust mechanisms are disposed on left and right sides of the projection lens in the front wall of the outer housing. Baffles are provided for guiding exhaust from the projection lens and exhaust ports such that they do not advance into the projected light flux to prevent a schlieren of the projected light flux.

3 Claims, 17 Drawing Sheets

PROJECTION TYPE DISPLAY APPARATUS

BACKGROUND OF THE INVENTION

This invention relates to a projection type display apparatus such as a liquid crystal projector, and more particularly to a technical field relating to a mechanism wherein a projection lens and an exhaust port for radiating heat of an internal heat source therethrough are disposed on a front wall of an outer housing.

Such a liquid crystal projector as shown in FIGS. 15 and 16 which is an example of a projection type display apparatus conventionally is known. Referring to FIGS. 15 and 16, the conventional liquid crystal projector 81 shown includes an outer housing 82 in which an optical unit not shown is built. A projection lens 83 and an exhaust port 84 are provided in a leftwardly and rightwardly juxtaposed relationship on a front wall 82a of the outer housing 82. An exhaust duct 87 having an exhaust fan 86 is disposed between the exhaust port 84 and a light source section 85 which is an internal heat source which generates heat of a high temperature in the optical unit. An image is projected from the projection lens 83 to a projection plane 88 such as a screen, and the exhaust fan 86 is operated so that heat of a high temperature generated by the light source section 85 and heat generated by a power supply section (not shown) and so forth which serve another internal heat source are exhausted in a direction parallel to an optical axis P of the projection lens 83 forwardly of the outer housing 82 from the exhaust port 84 through the exhaust duct 87 by the single exhaust fan 86 thereby to cool the internal heat sources such as the light source section 85 and the power supply section with air.

It is a possible idea to dispose the exhaust port 84 otherwise on a left or right side wall, a rear wall or the like of the outer housing 82. However, since usually a viewer who enjoys an image projected to the projection plane 88 from the projection lens 83 is normally seated around the liquid crystal projector 81 other than the front of the liquid crystal projector 81 outside a projection light flux 89 of the image to be projected to the projection plane 88 from the projection lens 83, a configuration wherein exhaust hot wind 90 of a high temperature generated by the light source section 85 and so forth is exhausted in the forward direction of the outer housing 82 which is the same direction as that of the projection direction of the projection lens 83 from the exhaust port 84 formed in the front wall 82a of the outer housing 82 is most preferable in that the exhaust hot wind 90 of a high temperature exhausted from the exhaust port 84 is not scattered to the viewer to provide a disagreeable feeling to the viewer or blasting sound generated by operation of the exhaust fan 86 is less likely to be offensive to the ear of the viewer.

However, with the system wherein heat generated by the light source section 85, the power supply section and so forth is exhausted from the single exhaust port 84 through the signal exhaust duct 87 using the single exhaust fan 86 as in the conventional liquid crystal projector 81, even if the heat of the light source section 85 can be exhausted comparatively efficiently, heat of such a power supply section as a setting power supply circuit board or a power supply circuit board for a light source section which is normally disposed at a position spaced away from the light source section 85 is cooled only by movement of the air in the inside of the outer housing 82 by operation of the single exhaust fan 86, and the entire cooling efficiency in the liquid crystal projector 81 is low. Therefore, the conventional apparatus has a problem in that it is likely to suffer from deterioration in performance, reduction of the life and so forth because electronic parts such as an IC in the proximity of the power supply section and so forth have a bad influence of heat generated by the power supply section and so forth.

Further, with the structure that the projection lens 83 and the exhaust port 84 are disposed in a leftwardly and rightwardly juxtaposed relationship on the front wall 82a of the outer housing 82 as in the conventional liquid crystal projector 81 described above, since the optical unit in the outer housing 82 and the projection lens 83 are offset to one side with respect to the center of the outer housing 82 in the leftward and rightward widthwise direction, the liquid crystal projector 81 suffers from an imbalance in weight in a leftward and rightward widthwise direction. Therefore, as shown in FIG. 17, when the liquid crystal projector 81 is suspended on a ceiling in a room etc. by means of hanger elements 94, the liquid crystal projector 81 is likely to be inclined in the leftward and rightward widthwise direction. Further, when an operator holds the liquid crystal projector 81 high above the head with both hands to perform an attaching operation of the liquid crystal projector 81 to the ceiling in order to hang the liquid crystal projector 81 on the ceiling, the liquid crystal projector 81 cannot be balanced readily in the leftward and rightward direction, and the attaching operation cannot be performed readily, or the balance may be lost, resulting in a falling or dropping accident of the liquid crystal projector 81. Further, when the liquid crystal projector 81 is hung on the ceiling 93 in a room or the like by the hanger elements 94, although generally an operator holds the liquid crystal projector 81 high above the head with both hands to set the projection lens 83 to a central position of the projection plane 88 such as a screen hung on a wall or the like, if the projection lens 83 is offset to one side of the outer housing 82, then since the projection lens 83 is displaced to one side from the position of the head of the operator, the projection lens 83 cannot be positioned at the center of the projection plane 88 with reference to the position of the head of the operator. Therefore, the operability is very low.

Further, in the system wherein, during projection of an image to the projection plane 88 such as a screen by the projection lens 83, the exhaust hot wind 90 of a high temperature generated from the light source section 85, the power supply section and so forth is exhausted in a direction parallel to the optical axis P of the projection lens 83 forwardly of the outer housing 82 which is the same direction as that of the projection light flux 89 by the projection lens 83 as in the conventional liquid crystal projector 81, particularly where a short focal length lens having a short focal length is used for the projection lens 83 and the projection angle (angle of view) θ of the projection light flux 89 is great, part of the exhaust hot wind 90 is liable to advance into part of the projection light flux 89.

Then, if the exhaust hot wind 90 advances into the projection light flux 89, then there is the possibility that a non-uniform air density region 91 wherein the refraction index of the air in the projection light flux 89 varies locally may be produced in the portion into which the exhaust hot wind 90 advances and a schlieren 92 by which such picture quality deterioration as fluctuation or distortion of an image projected to the projection plane 88 through within the non-uniform air density region 91 occurs with the image may possibly occur.

SUMMARY OF THE INVENTION

It is an object of the present invention to provide a projection type display apparatus wherein heat generated from a plurality of heat sources in the inside of an outer housing can be exhausted efficiently and the weight of the outer housing can be balanced readily in the leftward and rightward direction.

It is another object of the present invention to provide a projection type display apparatus wherein a projection lens and an exhaust port for an internal heat source are disposed on a front wall of an outer housing to assure a good convenience of use and occurrence of a schlieren of a projected flux of light by hot wind of exhaust air can be prevented.

In order to attain the objects described above, according to an aspect of the present invention, there is provided a projection type display apparatus, including an outer housing, first and second internal heat sources accommodated in the outer housing and operable to generate heat at different temperatures from each other, and first and second exhaust mechanisms including first and second exhaust fans for cooling the first and second internal heat sources independently of each other with air, respectively.

In the projection type display apparatus, hot air generated at the two locations by the first and second internal heat sources such as a light source section and a power supply section in the outer housing can be exhausted independently of each other without being thermally influenced by each other by the first and second exhaust mechanisms having the first and second exhaust fans, respectively. Consequently, the first and second internal heat sources in the outer housing can be individually cooled with air, and the entire inside of the outer housing can be cooled with a very high air-cooling efficiency. In particular, the exhaust mechanism for cooling a power supply section with air can cool electronic parts of the power supply section with air without being influenced by a light source section which acts as an internal heat source which exhibits a higher temperature than the power supply section. Consequently, deterioration in performance, reduction in life and so forth of the electronic parts of the circuits including the power supply section by a bad influence of heat can be prevented to the utmost. Accordingly, the projection type display apparatus is high in performance and long in durability.

The projection type display apparatus may further include a power supply section for supplying power for driving the projection type display apparatus, an optical unit including a light source section and a light valve for modulating light emitted from the light source section, and a projection lens for projecting the light modulated by the light valve to a screen, the first internal heat source being the light source section of the optical unit while the second internal heat source is the power supply section.

Preferably, the projection lens is disposed at a substantially central portion of a front wall of the outer housing, and first and second exhaust ports of the first and second exhaust mechanisms are disposed on the opposite sides of the projection lens in the front wall of the outer housing.

Since the first and second exhaust ports of the first and second exhaust mechanisms are disposed on the opposite sides of the projection lens in the front wall of the outer housing, the projection lens and the optical unit for color separation and color synthesis which have weight in a high ratio in the entire projection type display apparatus and positioned at the central position of the outer housing. Consequently, the entire projection type display apparatus can be balanced in weight readily and therefore can be hung stably on a ceiling or the like of a house. Further, since the exhausting directions of hot wind to be exhausted from the first and second exhaust ports can be set to the same direction as the projection direction of an image to a projection plane such as a screen by the projection lens, exhaust hot wind of a high temperature is not scattered to a viewer to provide a disagreeable feeling to the viewer or blasting sound generated by operation of the first and second exhaust fans is less likely to be offensive to the ear of the viewer. Therefore, the projection type display apparatus can be used in good convenience. Further, when an operator tries to hold the projection type display apparatus high above the head with both hands to attach the projection type display apparatus to a ceiling of a house, the projection type display apparatus can be balanced readily in weight. Furthermore, when the operator holds the projection type display apparatus high above the head with both hands, the projection lens can be positioned naturally above the head, and therefore, the operator can position the projection lens at the center of the projection plane with reference to the position of the head of the operator itself. Consequently, the attaching operation of the projection type display apparatus to a ceiling can be performed readily.

The projection type display apparatus may further include a first exhaust duct for interconnecting the first internal heat source and the first exhaust port, and a second exhaust duct for interconnecting the second internal heat source and the second exhaust port. With the projection type display apparatus, heat generated by the first and second internal heat sources can be exhausted efficiently as hot wind from the first and second exhaust ports through the first and second exhaust ducts.

Preferably, a duct wall of at least one of the first and second exhaust ducts is formed from part of the outer housing. This simplifies the structure and production of the projection type display apparatus. Thus, the production cost of the projection type display apparatus can be reduced by reduction of the number of parts and the number of assembly steps.

Preferably, the optical unit is disposed at a substantially central position in the outer housing, and the first exhaust duct is connected between the light source section of the optical unit and the first exhaust port which is disposed on one side of the front wall of the outer housing while the second exhaust duct is connected between the power supply section of the optical unit and the second exhaust port which is disposed on the other side of the front wall of the outer housing. This facilitates balancing in weight of the projection type display apparatus.

Preferably, the power supply section includes a setting power supply circuit board and a light source power supply circuit board, and the second exhaust duct has the duct wall formed from the outer housing in a substantially J- or L-shape along a side face portion to a rear face portion of the optical unit while the setting power supply circuit board and the light source power supply circuit board are disposed in the second exhaust duct. In the projection type display apparatus, the second exhaust duct can be formed with a great volume, and a plurality of power supply sections such as the setting power supply circuit board and the light source section power supply circuit board can be disposed readily in the inside of the second exhaust duct and can be cooled efficiently with air.

Preferably, intake ports for the first and second exhaust ducts are formed in the outer housing. In the projection type display apparatus, external cooling air can be sucked into the first and second exhaust ducts through the intake ports and used to compulsorily cool the first and second internal head sources efficiently with air.

Where the optical unit includes color separation means for separating the light emitted from the light source section into light components of different colors such that the light components of different colors may be inputted to a plurality of light valves provided in the optical unit and color synthesis means for synthesizing the light components from the light valves so that the synthesized light components are emitted from the projection lens, preferably the projection type display apparatus further includes an intake fan and an intake duct disposed on a bottom portion of the outer housing for compulsorily taking in air to the light source section and an image synthesis section formed from the light valves and the color synthesis section. In the projection type display apparatus, the image synthesis section and the light source section of optical unit can be compulsorily cooled efficiently with air by a synergetic effect of a compulsory intake action to the image synthesis section and the light source section by the intake mechanism including the intake fan and the intake duct disposed on a bottom portion of the outer housing and a compulsory exhaust action by the first exhaust mechanism.

According to another aspect of the present invention, there is provided a projection type display apparatus, including an outer housing, first and second internal heat sources accommodated in the outer housing and operable to generate heat at different temperatures from each other, first and second exhaust mechanisms including first and second exhaust fans for cooling the first and second internal heat sources independently of each other with air, respectively, a projection lens provided on a front wall of the outer housing, the outer housing having, in the front wall thereof, an exhaust port for radiating heat of the first and/or second internal heat sources, and wind guiding means for guiding hot wind exhausted from the exhaust port so that the hot wind may not advance into a projection light flux of an image to be projected from the projection lens.

In the projection type image display apparatus, although the projection lens and the exhaust port or ports for the internal heat sources are disposed on the front wall of the outer housing and hot air of heat generated by the internal heat sources is exhausted in the forwardly direction of the outer housing same as the projection direction by the projection lens, the hot wind exhausted from the exhaust port or ports can be guided so that it does not advance into a projection light flux of an image to be projected by the projection lens. Consequently, even where a short focal length lens is used as the projection lens and the angle of view of the projection light flux to be projected to the projection plane such as a screen is great, such a situation that part of the hot wind exhausted from the exhaust port or ports advances into the projection light flux to cause picture quality deterioration such as fluctuation or distortion of an image by a schlieren can be prevented. Consequently, the projection type image display apparatus can normally project an image of high quality.

Where the projection type image display apparatus further include an exhaust duct disposed between the internal heat source and the exhaust port, preferably the wind guiding means may include baffles provided in the inside of an end portion of the exhaust duct adjacent the exhaust port. Or else, the wind guiding means may include an exhaust fan disposed on the inner side of the exhaust port or baffles provided in the exhaust port. In the projection type image display apparatus, provision of a special mechanism for preventing a schlieren can be eliminated. Consequently, the projection type image display apparatus is simplified in structure and production and can be produced at a reduced cost.

Preferably, an inclination direction of the baffles is adjustable. In the projection type display apparatus, the exhausting direction of hot wind to be exhausted from the exhaust port or ports can be adjusted freely in accordance with the focal length of the projection lens. Consequently, prevention of a schlieren can be realized with a higher degree of certainty.

These and other objects and features of the present invention will become clear from the following description of the preferred embodiment given with reference to the accompanying drawings in which like parts or elements are denoted by like reference symbols.

DETAILED DESCRIPTION OF THE PREFERRED EMBODIMENTS

Figure 1:
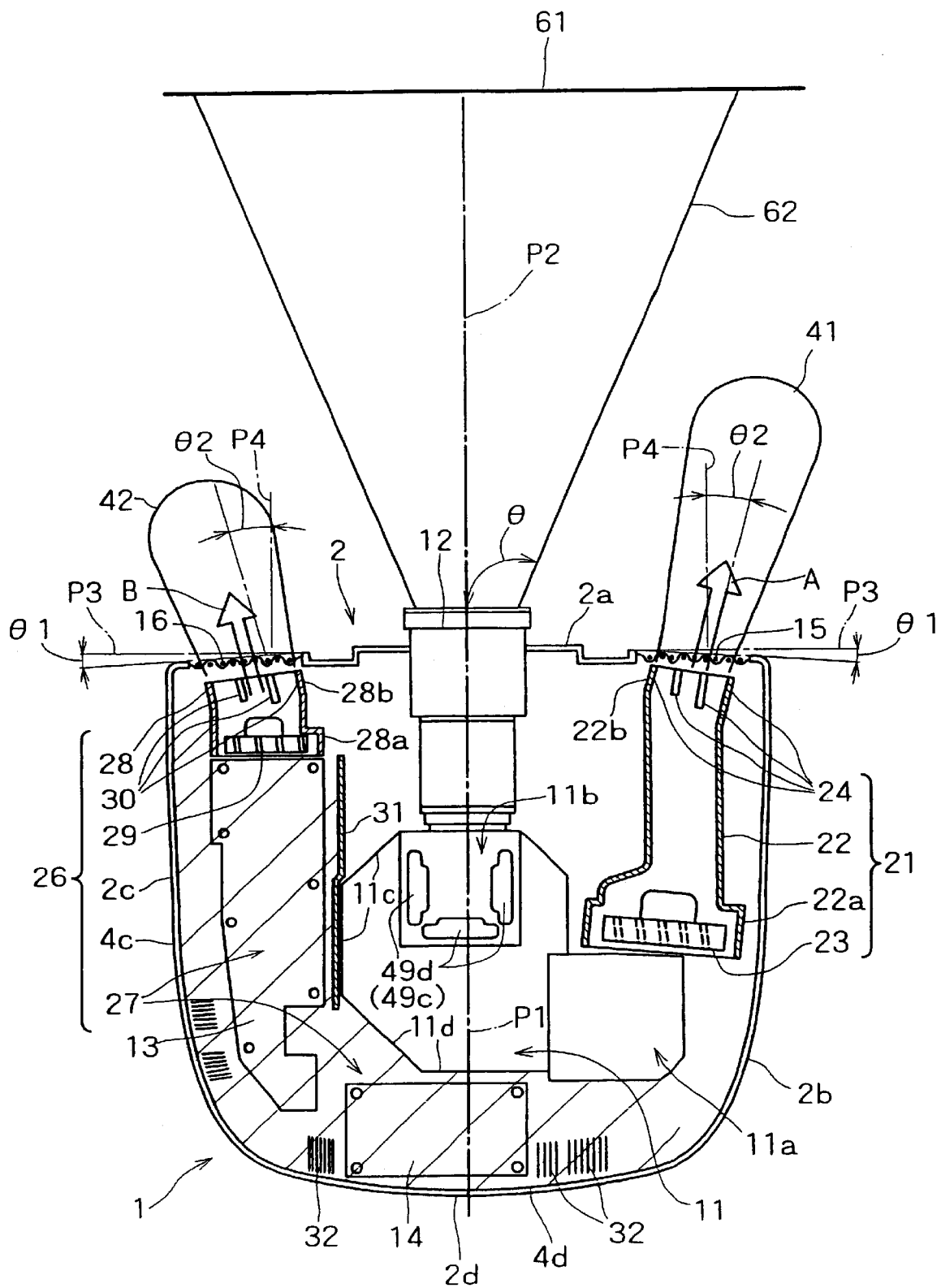
FIG. 1 is a plan view, partly in section, of a liquid crystal projector to which a projection type display apparatus according to the present invention is applied.
Figure 2:
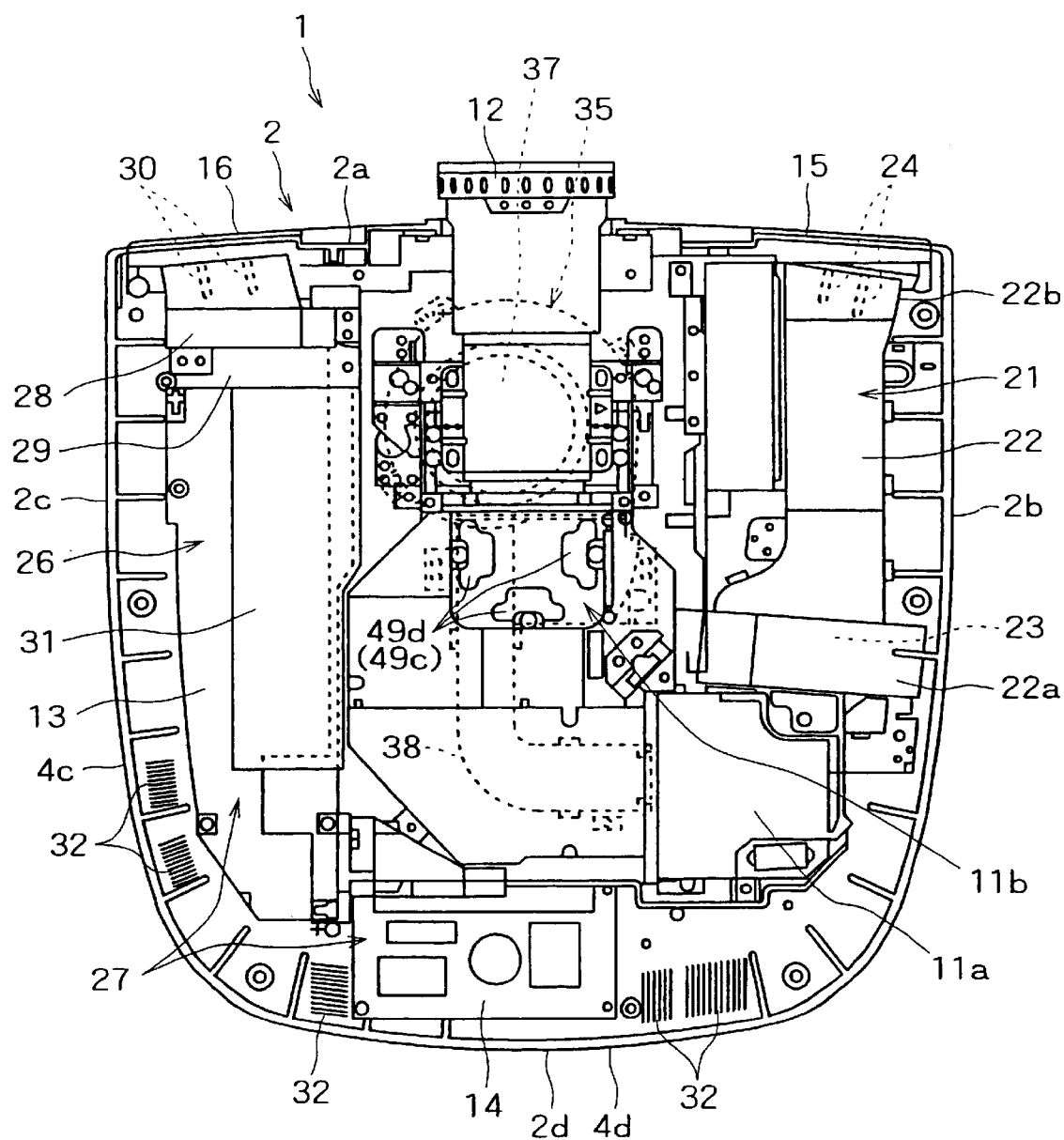
FIG. 2 is a plan view showing the liquid crystal projector of FIG. 1 with an upper case removed.
Figure 3:
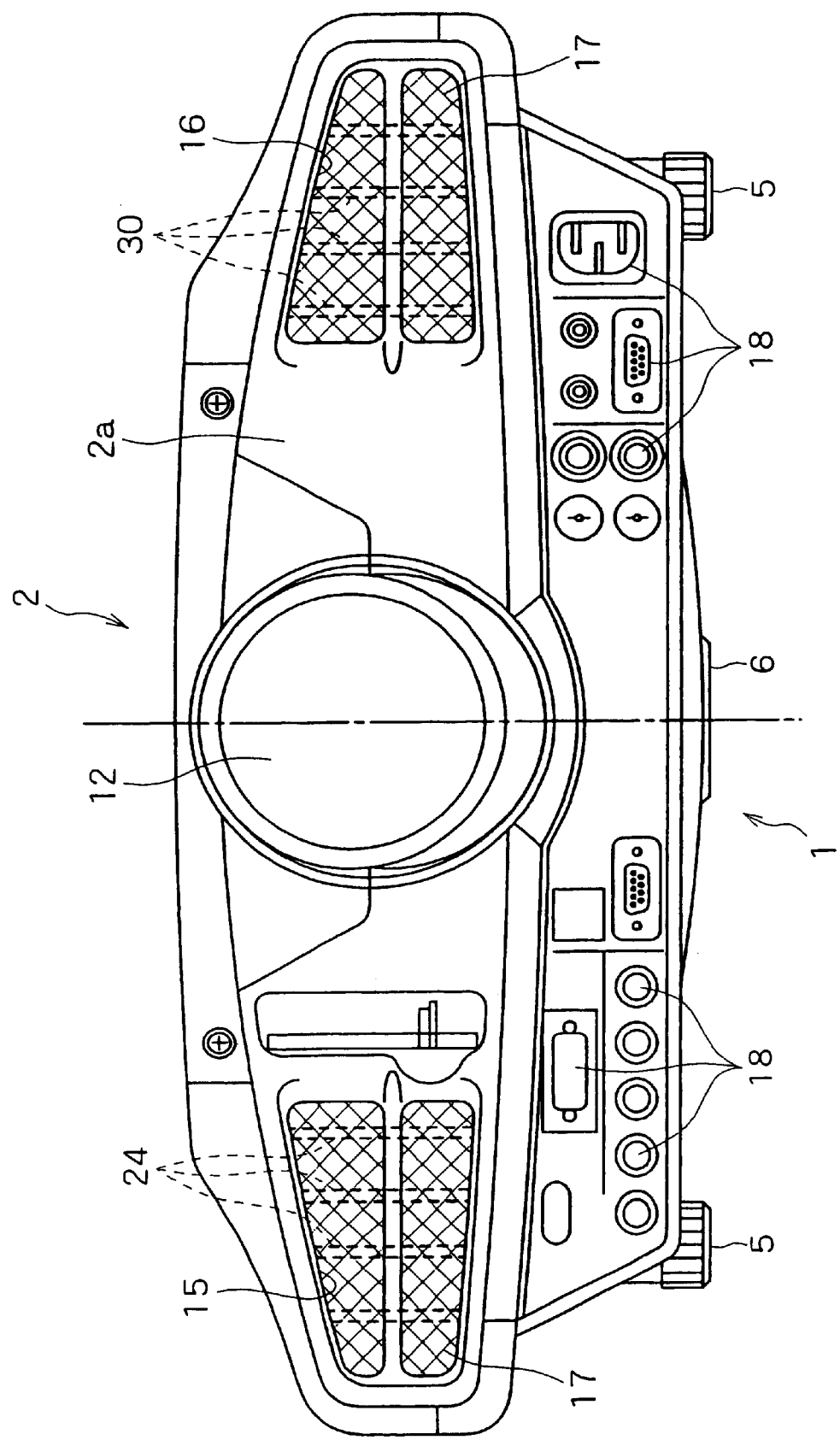
FIG. 3 is a front elevational view of the liquid crystal projector of FIG. 1.
Figure 4:
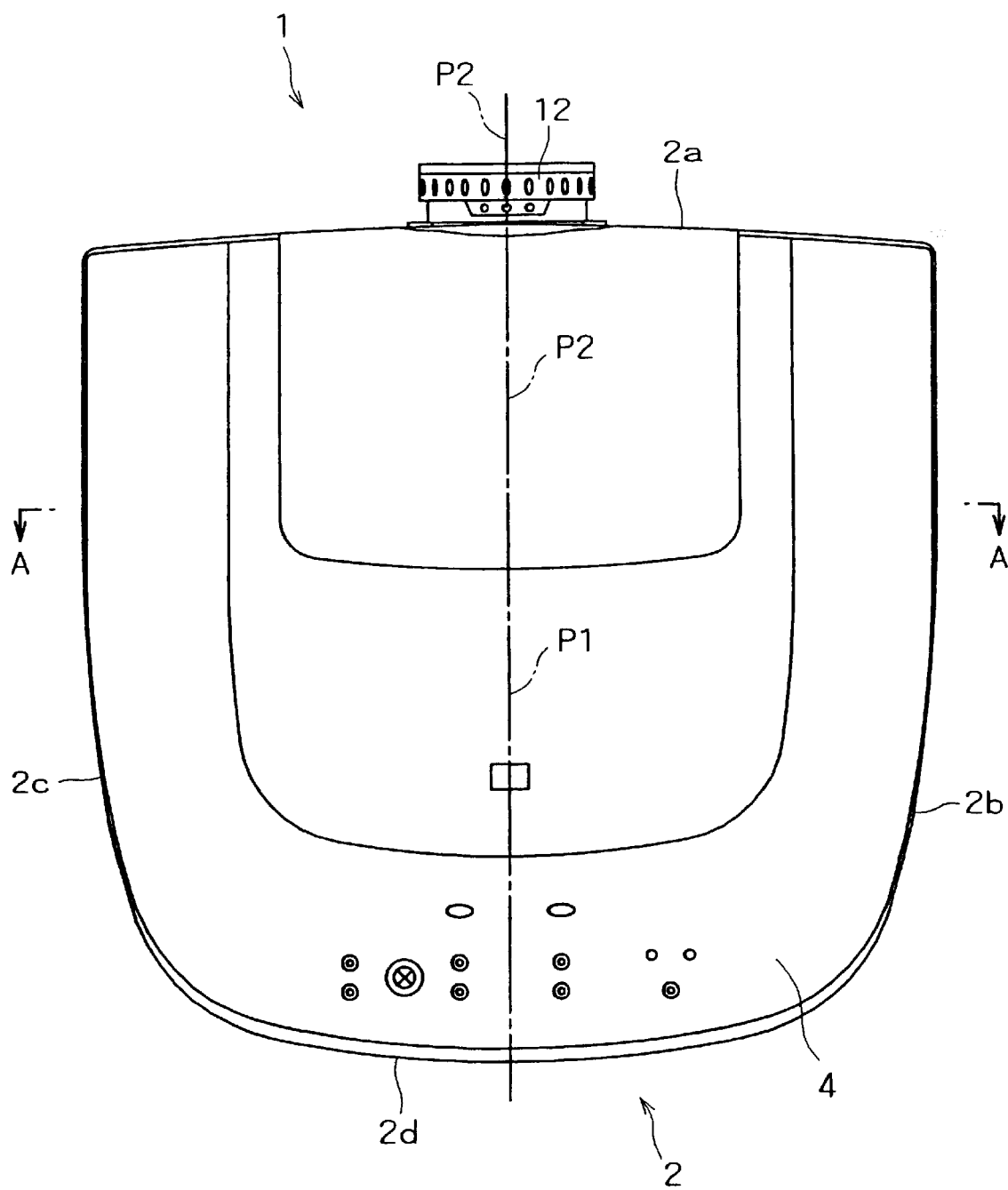
FIG. 4 is a top plan view of the liquid crystal projector of FIG. 1.

Referring to FIGS. 1 to 9, there is shown a liquid crystal projector to which the present invention is applied. The liquid crystal projector is generally denoted at 1 and includes an outer housing 2 composed of a lower case 3 and an upper case 4 molded from a heat-resisting synthetic resin material or the like and formed as a flattened box. The upper case 4 is removably coupled to the top of the lower case 3 by means of screws or the like. A front wall 2a of the outer housing 2 is curved in a moderate arc, and portions of the outer housing 2 from the opposite left and right side walls 2b and 2c to a rear wall 2d are formed from moderate continuous curved walls curved symmetrically in a substantially U-shape. A pair of left and right adjusters 5 are attached to positions of the bottom wall 2e a little displaced to the front wall 2a, and a single stand member 6 molded integrally with the lower case 3 is disposed at a substantially central portion of the position of the bottom wall 2e displaced a little to the rear wall 2d. Accordingly, when the liquid crystal projector 1 is placed on a table or the like, the pair of left and right adjusters 5 can be adjusted in height so that the liquid crystal projector 1 can be supported horizontally through three-point support by the adjusters 5 and the stand member 6. Further, in order to hang the liquid crystal projector 1 on a ceiling, it is attached to ceiling hanger metal members not shown provided on the ceiling by means of bolts or the like screwed in threaded holes 7 provided at four locations of the lower case 3.

In the inside of the outer housing 2, an optical unit 11 is disposed horizontally at the center P1 of the outer housing 2 in the leftward and rightward direction and screwed at a predetermined height position on the lower case 3. A projection lens 12 is provided contiguously to a front end of an image synthesis section 11b, which is hereinafter described, of the optical unit 11 such that an optical axis P2 thereof is disposed substantially coaxially with the center P1 of the outer housing 2. The projection lens 12 is screwed to the lower case 3 in a state wherein it projects forwardly of the front wall 2a of the outer housing 2. A light source section 11a of the optical unit 11 which is a first internal heat source which generates heat of the highest temperature during projection of an image hereinafter described is disposed at a position in the outer housing 2 displaced a little to the side wall 2b side of a rear end portion of the optical unit 11. Also the light source section 11a is screwed to the lower case 3.

Further, as a second internal heat source which generates heat of a comparatively low temperature during projection of an image hereinafter described, a setting power supply circuit board 13 and a light source section power supply circuit board 14 are provided which form a power supply section for supplying power to drive the liquid crystal projector 1. The setting power supply circuit board 13 is a power supply circuit board for driving circuits necessary for driving an ordinary display apparatus such as a control circuit, a signal processing circuit and a liquid crystal panel drive circuit for the liquid crystal projector 1. Meanwhile, the light source section power supply circuit board 14 is a power supply circuit board for driving the light source section to emit light. The setting power supply circuit board 13 is disposed horizontally on the optical unit 11 adjacent the side wall 2c within the outer housing 2, and the light source section power supply circuit board 14 is disposed horizontally on the optical unit 11 adjacent the rear wall 2d, that is, on the rear side portion side of the optical unit 11, within the outer housing 2. Also the setting power supply circuit board 13 and the light source section power supply circuit board 14 are screwed horizontally at predetermined height positions of the lower case 3.

First and second exhaust ports 15 and 16 are formed in a leftwardly and rightwardly symmetrical relationship with each other at leftwardly and rightwardly symmetrical positions with respect to the projection lens 12 on the opposite left and right side positions of the moderately arcuate front wall 2a of the outer housing 2. Since the first and second exhaust ports 15 and 16 are formed in a leftwardly and rightwardly symmetrical relationship with each other along the moderately arcuate front wall 2a, a leftwardly and rightwardly symmetrical opening angle θ1 is set to the first and second exhaust ports 15 and 16 on the opposite left and right sides with respect to a reference plane P3 perpendicular to the optical axis P2 of the projection lens 12. It is to be noted that a front wall grill 17 formed from a porous plate such as a punched metal plate or a net-like member is attached to each of the first and second exhaust ports 15 and 16. Further, a large number of connectors 18 are provided at positions on the front wall 2a of the outer housing 2 corresponding to and below the projection lens 12 and the first and second exhaust ports 15 and 16.

A first exhaust mechanism 21 for exhausting heat of a high temperature generated from the light source section 11a of the optical unit 11 serving as the first internal heat source to the outside of the outer housing 2 through the first exhaust port 15 and a second exhaust mechanism 26 for exhausting heat of a low temperature generated by the setting power supply circuit board 13 and the light source section power supply circuit board 14 serving as the second internal heat source to the outside of the outer housing 2 through the second exhaust port 16 are provided in the outer housing 2.

The first exhaust mechanism 21 is disposed in the inside of the optical unit 11 adjacent the side wall 2b (FIG. 6) and includes, a prism-shaped or cylindrical-shaped first exhaust duct 22 molded from a heat-resisting synthetic resin material or the like connected between the light source section 11a and the first exhaust port 15, a first exhaust fan 23 for high output power disposed in an intake side end portion 22a of the first exhaust duct 22 adjacent the light source section 11a, a plurality of first baffles 24 molded integrally and extending vertically and in parallel to each other in an exhaust side end portion 22b of the first exhaust duct 22 adjacent the first exhaust port 15 and serving as wind guiding means. The first exhaust fan 23 is screwed in the first exhaust duct 22, which in turn is screwed to the lower case 3.

The second exhaust mechanism 26 is disposed in the inside of the optical unit 11 adjacent the side wall 2c (FIG. 6) and includes, as indicated by slanting lines in FIG. 1, a cylindrical-shaped second exhaust duct 27 of a varying diameter formed long such that it extends in a substantially J-shape or L-shape along the insides of the side wall 2c and the rear wall 2d of the outer housing 2 along the other side portion and the rear side portion of the optical unit 11, a prism-shaped or cylindrical-shaped second auxiliary exhaust duct 28 disposed between the second exhaust duct 27 and the second exhaust port 16, a second exhaust fan 29 of a small size disposed in an intake side end portion 28a of the second auxiliary exhaust duct 28 adjacent the second exhaust duct 27, and a plurality of second baffles 30 molded integrally and extending vertically and in parallel to each other in an exhaust side end portion 28b of the second auxiliary exhaust duct 28 adjacent the second exhaust port 16.

Figure 6:
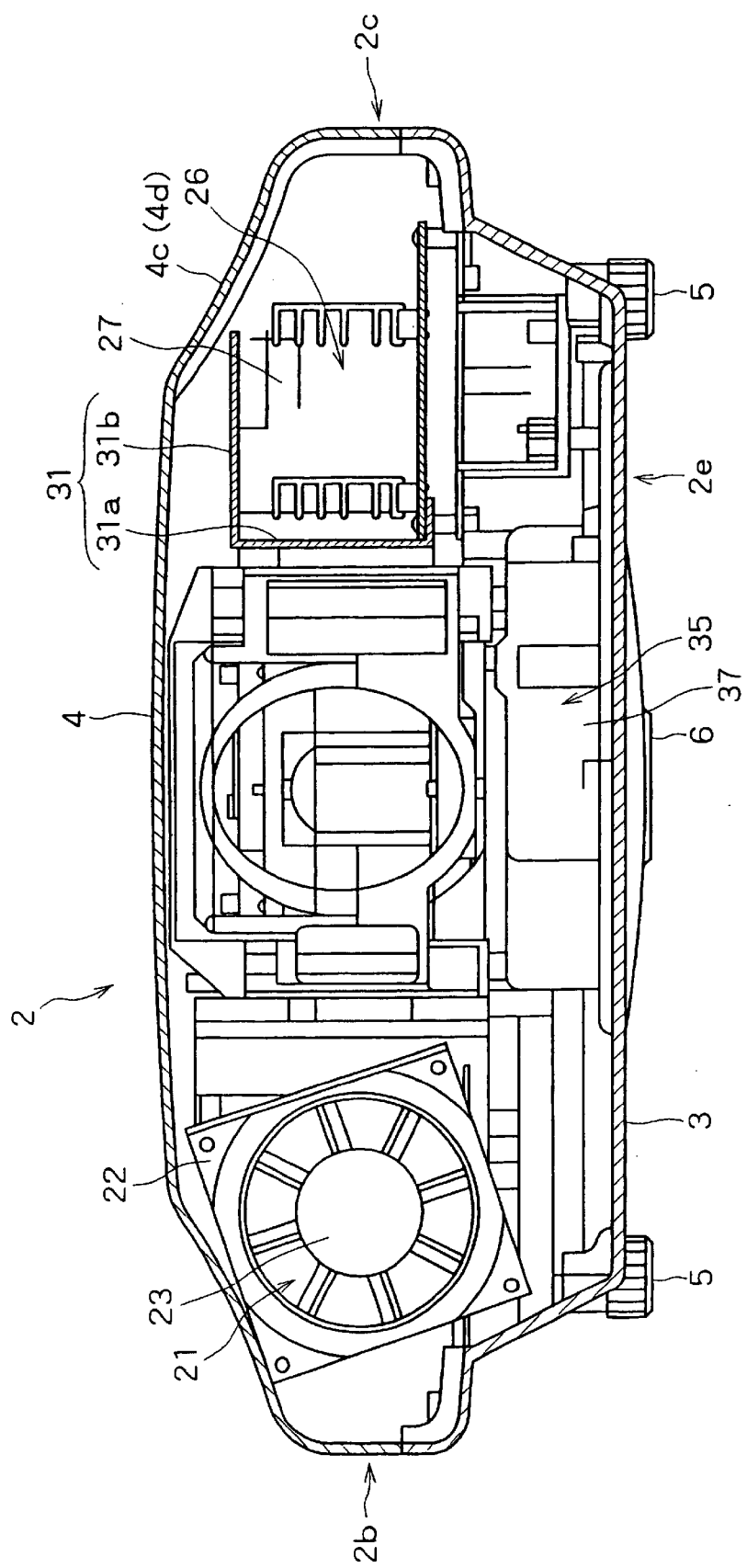
FIG. 6 is a sectional view taken along line A—A of FIG. 4 showing the liquid crystal projector of FIG. 1.

The bottom wall of the second exhaust duct 27 of the second exhaust mechanism 26 curved in a substantially J-shape is formed from the setting power supply circuit board 13 and the light source section power supply circuit board 14 while the outer side wall and the outer rear wall are formed from the duct walls 4c and 4d of the upper case 4, and the inner rear wall is formed from the rear wall 11d of the optical unit 11 and the inner side wall is formed from an insulating plate 31. The insulating plate 31 is mounted on the lower case 3 and fastened by screws or the like together with the light source section power supply circuit board 14. The insulating plate 31 stands uprightly in an L-shape at an upper portion of the light source section power supply circuit board 14. A vertical portion 31a which rises vertically uprightly from the light source section power supply circuit board 14 of the insulating plate 31 covers a distorted shape portion 11c, which extends from a side wall portion to a front wall portion of the optical unit 11, substantially in parallel to the upper case 4 of the upper case 4. A horizontal portion 31b bent horizontally outwardly from the vertical portion 31a is disposed above the second exhaust duct 27 (FIG. 6). A plurality of intake ports 32 formed from a large number of parallel slits are formed at a bottom portion of the lower case 3 corresponding to the bottom of the second exhaust duct 27.

If an elongated cavity for exhaust air having a varying cross section and curved in a moderate substantially J-shape is formed from the duct walls 4c and 4d used also for the upper case 4, the rear wall portion 11d of the optical unit 11 and the insulating plate 31 like the second exhaust duct 27, then a cavity for exhaust air which has a large area and is superior in fluidity of air can be formed readily in the inside of the outer housing 2. Accordingly, heat generating parts of a large size such as the setting power supply circuit board 13 and the light source section power supply circuit board 14 can be accommodated in the second exhaust duct 27 readily and cooled efficiently. Besides, also reduction of the cost by reduction of the number of parts and the number of steps for assembly can be anticipated.

The first and second baffles 24 and 30 of the first and second exhaust mechanisms 21 and 26 which extend vertically in parallel to each other are formed as a wind guiding mechanism for guiding exhaust hot wind, which is hereinafter described, to the opposite left and right sides of a projection light flux which is hereinafter described so that the exhaust hot wind may not advance into the projection light flux. The first and second baffles 24 and 30 extending vertically and in parallel to each other are disposed with an inclination angle θ2 in a leftwardly and rightwardly symmetrical relationship such that they extend outwardly in an expanding fashion to the left and right sides with respect to a reference line P4 parallel to the optical axis P2 of the projection lens 12 and to the front of the outer housing 2.

An intake mechanism 35 is incorporated horizontally at a position in the bottom wall 2e of the outer housing 2 below the optical unit 11. The intake mechanism 35 is formed from an intake port 36 formed from a plurality of parallel slits in a bottom portion of the lower case 3, an intake fan 37 such as a sirocco fan, and an intake duct 38. The intake duct 38 has formed therein three in-feed ports 39 for feeding cooling air into the image synthesis section 11b of the optical unit 11, which is hereinafter described, from below, and one in-feed port 40 for feeding cooling air from below the light source section 11a to the light source section 11a of the optical unit 11.

Figure 8:
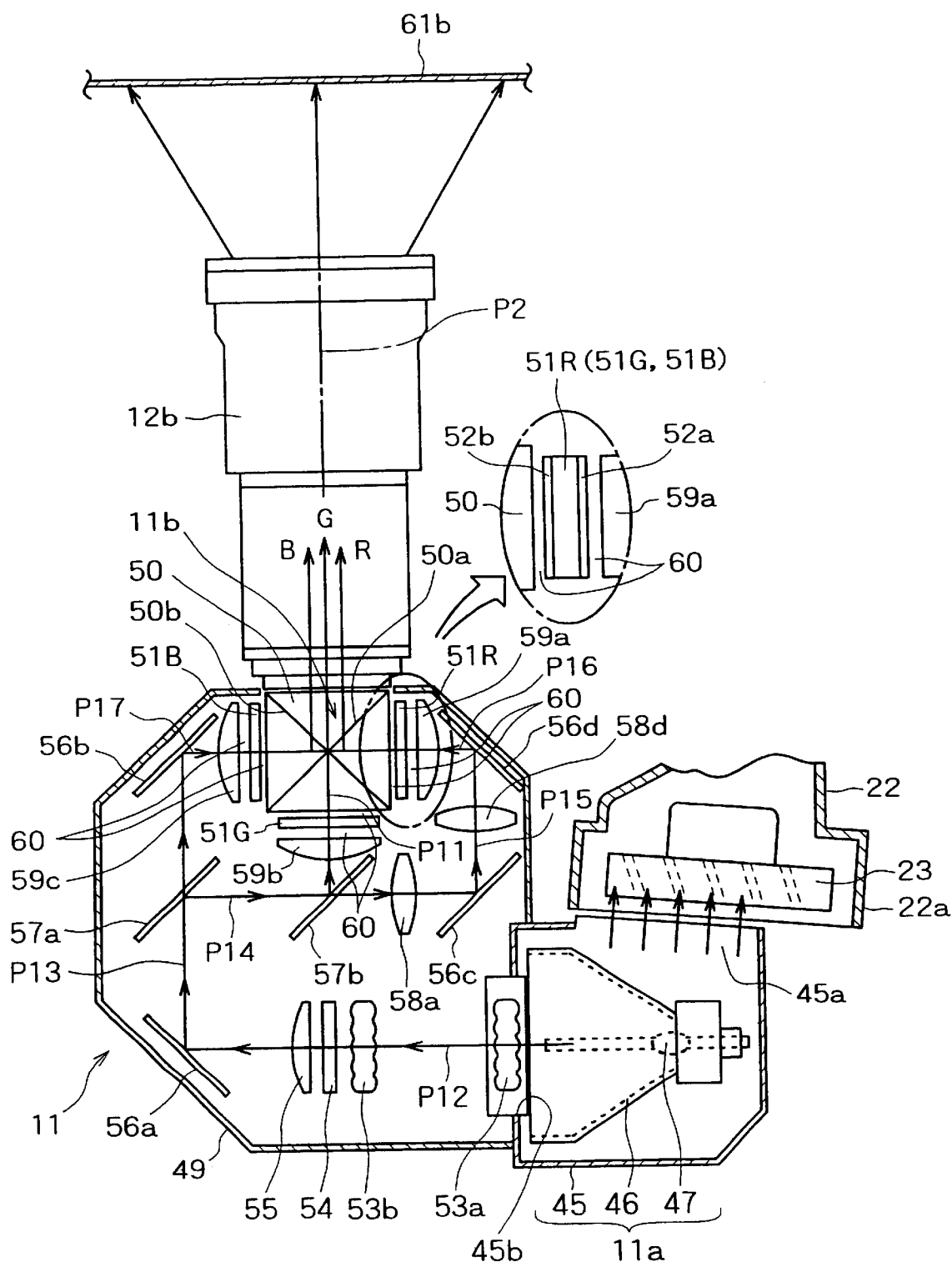
FIG. 8 is a plan view, partly in section, showing an optical unit of the liquid crystal projector of FIG.

Now, the optical unit 11 is described with reference to FIG. 8. The light source section 11a of the optical unit 11 includes a reflecting mirror 46 as a reflector accommodated in a light source section cover 45, and a discharge lamp 47 such as a high pressure mercury lamp as a light source positioned at the center in the reflecting mirror 46. The intake side end portion 22a of the of the first exhaust duct 22 and the first exhaust fan 23 of the first exhaust mechanism 21 are opposed to an exhausting opening portion 45a open to the front side of the light source section cover 45. The image synthesis section 11b of the optical unit 11 is disposed at a front end portion in an optical unit cover 49. The image synthesis section 11b includes a cross prism 50 of a square shape disposed on an optical axis P11 on an extension line of the optical axis P2 of the projection lens 12 and serving as color synthesis means (image synthesis means), and three liquid crystal panels 51R, 51G and 51B disposed in parallel to and adjacent three faces of the cross prism 50 except the face of the same adjacent the projection lens 12 and serving as spatial modulation elements. Each of the liquid crystal panels 51R, 51G and 51B has an incoming side polarizing plate 52a and an outgoing side polarizing plate 52b disposed on an incoming face and an outgoing face thereof and acts as a light valve which modulates incoming light based on a signal applied thereto and sending out the modulated light.

In the optical unit cover 49, an optical axis P12 of white light emitted from the light source section 11a is disposed perpendicularly to the optical unit 11, and first and second multi-lens arrays 53a and 53b serving as means for making light uniform to be irradiated upon the faces of the liquid crystal panels 51R, 51G and 51B are disposed on the projection lens 12. Further, a PS converter 54 serving as polarization means for converting light from the light source section 11a into light polarized in a predetermined direction and a condenser 55 are disposed on the optical axis P12. A mirror 56a is disposed in an inclined relationship by 45° on the optical axis P12 such that white light emitted from the light source section 11a is reflected at an angle of 90°0 by the mirror 56a so that it thereafter advances along an optical axis P13 parallel to the optical axis P12 of the projection lens 12. A first dichroic mirror 57afor passing a B (blue) component but reflecting G (green) and R (red) components of light and a mirror 56b are disposed in an inclined relationship by 45° on the optical axis P13. On an optical axis P14 of light reflected by the first dichroic mirror 57a to a direction of 90° with respect to the optical axis P13, a second dichroic mirror 57b for passing an R component but reflecting a G component of light, a relay lens 58a and a mirror 56c for reflecting an R component are disposed. The second dichroic mirror 57b is disposed at an intersecting point of the optical axis P11 and the optical axis P14 in an inclined relationship by 45° to both of the optical axes P11 and P14.

The mirror 56c is inclined by 45° with respect to the optical axis P14, and a relay lens 58b and a mirror 56d for reflecting an R component are disposed on an optical axis P15 of light reflected at an angle of 90° by the mirror 56c. The two liquid crystal panels 51R and 51B are disposed on optical axes P16 and P17 of light reflected at an angle of 90° by the mirrors 56b and 56d and incoming to the opposite left and right sides of the cross prism 50, respectively, and the liquid crystal panel 51G is disposed on the optical axis P11 of light reflected at an angle of 90° by the dichroic mirror 57b and incoming to the cross prism 50. Condensers 59a, 59b and 59c are disposed at positions of the liquid crystal panels 51R, 51G and 51B on the three optical axes P11, P16 and P17 remote from the cross prism 50. An air-cooling gap 60 is formed vertically between the cross prism 50 of the image synthesis section 11b and each of the three liquid crystal panels 51R, 51G and 51B and between each of the three liquid crystal panels 51R, 51G and 51B and a corresponding one of the three condensers 59a, 59b and 59c.

Figure 5:
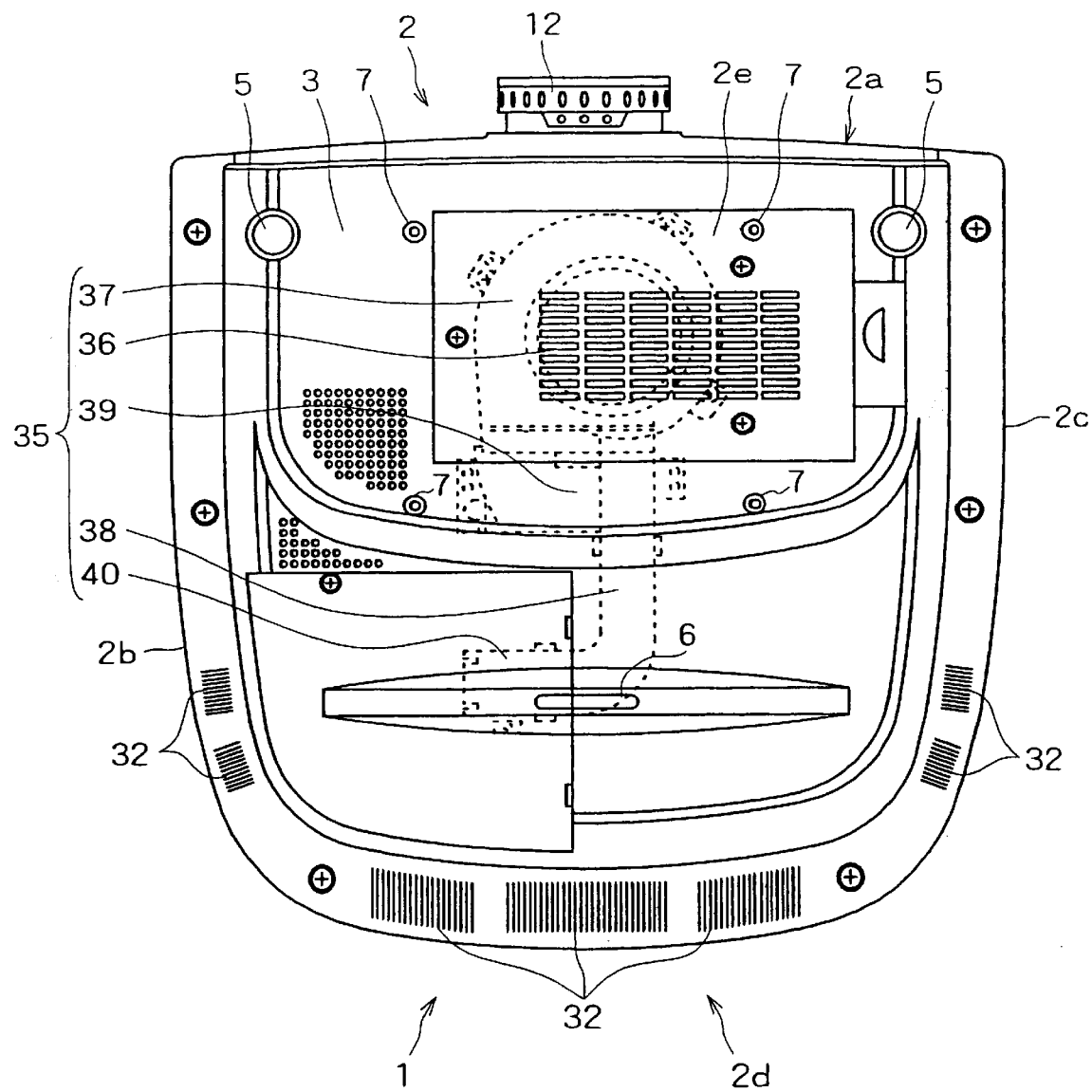
FIG. 5 is a bottom plan view of the liquid crystal projector of FIG. 1.
Figure 7:
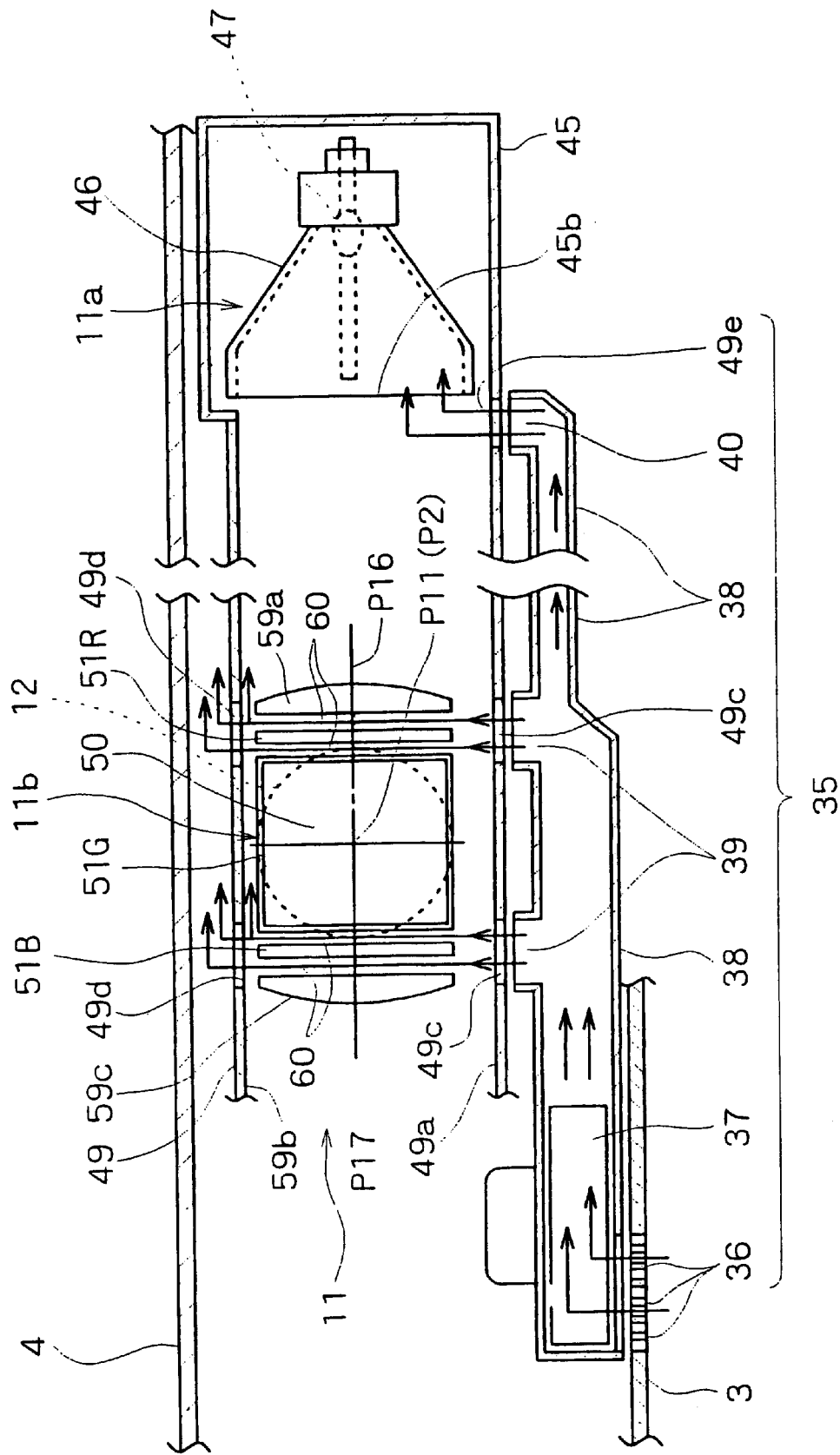
FIG. 7 is a sectional view showing an intake mechanism of the liquid crystal projector of FIG. 1 in an exploded form.

Referring to FIGS. 1, 5 and 7, the three in-feed ports 39 are formed in a channel-shaped configuration at upper portions of the intake duct 38 of the intake mechanism 35 in a corresponding relationship to the liquid crystal panels 51R, 51G and 51B, and the one in-feed port 40 is formed at an upper portion of an end portion of the intake duct 38. At positions of a bottom portion 49a and a top portion 49b of the optical unit cover 49 of the optical unit 11 above and below the vertical air-cooling gaps 60 formed on the opposite sides of the tree liquid crystal panels 51R, 51G and 51B corresponding to the three peripheral faces of the cross prism 50, three bottom openings 49c and three top openings 49d are formed and disposed in a channel-shaped configuration. The three in-feed ports 39 formed in the intake duct 38 are opposed to lower portions of the three bottom openings 49c. The in-feed port 40 formed at an upper portion of an end portion of the intake duct 38 is connected to a lower portion of an intake opening 45b of the light source section cover 45 through a bottom opening 49e formed in the bottom portion 49a of the optical unit cover 49.

The optical unit 11 is formed in such a manner as described above. Thus, white light emitted from the discharge lamp 47 of the light source section 11a as a result of energization of the discharge lamp 47 is reflected by the reflecting mirror 46 and converted into substantially parallel light. The parallel white light is emitted along the optical axis P12. Then, the white light is converted into uniform white light having uniform luminance by the first and second multi-lens arrays 53a and 53b each formed from a large number of lenses. In particular, the substantially parallel white light is first divided into a large number of light fluxes by the large number of lenses of the first multi-lens array 53a, and the large number of light fluxes are condensed substantially at the centers of corresponding ones of the large number of lenses of the second multi-lens array 53b. The large numbers of condensed light fluxes pass through and are polarized by the PS converter 54 and then are condensed by the condenser 55 to form uniform white light having uniform luminance so that a region corresponding to the face of the liquid crystal panel may be illuminated with the uniform white light. Then the uniform white light having uniform luminance advances along the optical axes P11, P13, P14, P15, P16 and P17 so that it is irradiated substantially uniformly upon the entire faces of the three liquid crystal panels 51R, 51G and 51B, which are hereinafter described, to illuminate the liquid crystal panels 51R, 51G and 51B.

Thereupon, the white light is divided into light components of the tree colors of different wavelength bands, that is, red light R, green light G and blue light B as it is reflected by and/or passes through the color separation means composed of the mirrors 56a, 56b, 56c and 56d and the dichroic mirrors 57a and 57b. In particular, the white light is first reflected by the mirror 56a and changes its advancing direction by 90° from the optical axis P12 to the optical axis P13 so that it is introduced into the first dichroic mirror 57a. Then, the first dichroic mirror 57a reflects the R and G components of the white light to change the advancing direction of them by 90° to the optical axis P14 while it passes the B component of the white light therethrough. Then, the R and G components reflected by the first dichroic mirror 57a are inputted to the second dichroic mirror 57b. Thus, the second dichroic mirror 57b passes the R component therethrough while it reflects the G component to change the advancing direction of the G component by 90° to the optical axis P2.

The R component having passed through the second dichroic mirror 57b then passes through the relay lens 58a on the optical axis P14 and is reflected by the mirror 56c so that the advancing direction thereof changes by 90°. Then, the R component passes through the relay lens 58b on the optical axis P15 and then is reflected by the mirror 56d so that the advancing direction thereof changes by 90°. Consequently, the R component is introduced to the incidence plane of the liquid crystal panel 51R through the condenser 59a on the optical axis P16.

Meanwhile, the G component having been reflected by the second dichroic mirror 57b to change the advancing direction by 90° is introduced to the incidence plane of the liquid crystal panel 51G through the condenser 59b on the optical axis P11. Further, the B component having been reflected by the mirror 56b to change the advancing direction by 90° is introduced to the incidence plane of the liquid crystal panel 51B through the condenser 59c on the optical axis P17.

In this instance, the three R, G and B components of the light are polarized by incoming side polarizing plates 52a of the three liquid crystal panels 51R, 51G and 51B, respectively, so that the polarization directions thereof are adjusted to one another, whereafter they are introduced to the three liquid crystal panels 51R, 51G and 51B, respectively. Then, the liquid crystal panels 51R, 51G and 51B modulate the R, G and B components with video signals applied thereto corresponding to the individual wavelength bands to rotate the polarization planes of them. Of the three R, G and B components having the rotated polarization planes, predetermined polarized light components are passed through outgoing side polarizing plates 52b of the liquid crystal panels 51B, 51G and 51B thereby to obtain video light components. The three R, G and B video light components are inputted to the three faces of the cross prism 50 from the three optical axes P11, P16 and P17, respectively.

Then, the cross prism 50 reflects the R and B video light components with two perpendicular reflecting faces 50a and 50b thereof and passes the G video light component through the two reflecting faces 50a and 50b thereof thereby to synthesize the three R, G and B video light components. Then, the three R, G and B video light components synthesized in this manner are projected from the projection lens 12 to a projection plane 61 such as a screen so that a full-color image (video) is thrown on the projection plane 61.

During such projection of an image to the projection plane 61 by the optical unit 11, the light source section 11a is heated to the highest temperature by heat generated by the discharge lamp 47. Meanwhile, the three liquid crystal panels 51R, 51G and 51B disposed on the three peripheral faces of the cross prism 50 of the image synthesis section 11b of the optical unit 11 and the incoming side polarizing plates 52a and the outgoing side polarizing plates 52b disposed on the incidence planes and the emergence planes of the opposite faces of the liquid crystal panels 51R, 51G and 51B are heated by heat generated by absorption of unnecessary polarized light components of incoming light and absorption of light whose polarization planes have been rotated by application of video signals. Consequently, also the temperature of the entire image synthesis section 11b rises. Further, since heat generating parts such as a capacitor or an IC are mounted on the setting power supply circuit board 13 and the light source section power supply circuit board 14, heat is generated also on the setting power supply circuit board 13 and the light source section power supply circuit board 14.

Therefore, in the liquid crystal projector 1, heat generated by the light source section 11a and the image synthesis section 11b of the optical unit 11 and the first and second internal heat sources such as the setting power supply circuit board 13 and the light source section power supply circuit board 14 during projection of an image is compulsorily and efficiently cooled with air by the first exhaust mechanism 21 and intake mechanism 35 and the second exhaust mechanism 26.

Here, the compulsory air-cooling operation of the light source section 11a and the image synthesis section 11b of the optical unit 11 is described. First, the intake fan 37 of the intake mechanism 35 shown in FIG. 7 is rendered operative to suck external cooling air from the intake port 36 of the bottom wall 2e of the outer housing 2 into the intake duct 38 and feed part of the external cooling air vertically upwardly to a lower portion of the image synthesis section 11b of the optical unit 11 from the three in-feed ports 39 on the base end side of the intake duct 38 through the three bottom openings 49c so that the cooling air is fed vertically upwardly from below into the air-cooling gaps 60 on the opposite sides of the three liquid crystal panels 51R, 51G and 51B on the three peripheral faces of the cross prism 50 shown in FIGS. 7 and 8 to compulsorily cool portions particularly of the incoming side polarizing plates 52a and the outgoing side polarizing plates 52b around the cross prism 50 and the liquid crystal panels 51R, 51G and 51B. Further, the other part of the external cooling air taken into the intake duct 38 is fed into the light source section cover 45 of the light source section 11a of the optical unit 11 from the in-feed port 40 through the bottom opening 49e and the intake opening 45b.

Simultaneously, the first exhaust fan 23 of the first exhaust mechanism 21 is rendered operative to compulsorily suck hot wind of a high temperature in the light source section cover 45 into the intake side end portion 22a of the first exhaust duct 22 from the exhausting opening portion 45a of the light source section cover 45 of the light source section 11a and compulsorily suck hot wind around the outer peripheral portion of the light source section cover 45 into the intake side end portion 22a of the first exhaust duct 22. Then, first exhaust hot wind 41 compulsorily sucked into the first exhaust duct 22 is compulsorily exhausted outwardly from the first exhaust port 15 of the front wall 2a through within the first exhaust duct 22.

As a result, a compulsory sucking action of external air by the intake mechanism 35 and a compulsory exhausting action by the first exhaust mechanism 21 are performed synergetically for the light source section 11a, and consequently, the image synthesis section 11b can be compulsorily cooled efficiently. It is to be noted that, in this instance, also the cross prism 50 and the incoming side polarizing plates 52a and the outgoing side polarizing plates 52b on the opposite side faces of the three liquid crystal panels 51R, 51G and 51B are cooled efficiency by part of external cooling air sucked by the intake fan 37 of the intake mechanism 35 into the intake duct 38 and fed into the vertical air-cooling gaps 60 at the three locations around the cross prism 50 in the optical unit cover 49 from below from the three in-feed ports 39 through the three bottom openings 49c. Further, part of the external air fed from below into the air-cooling gaps 60 is sucked toward the light source section cover 45 in the optical unit cover 49 by a sucking action by the first exhaust fan 23 of the first exhaust mechanism 21 or sucked to an outer peripheral portion of the light source section cover 45 after it goes out to the outside of the optical unit cover 49 from the three top openings 49d so that it is exhausted from the first exhaust port 15 by the first exhaust duct 22.

Now, the compulsory air cooling operation of the setting power supply circuit board 13 and the light source section power supply circuit board 14 is described with reference to FIGS. 1 to 8. When the second exhaust fan 29 of the second exhaust mechanism 26 is rendered operative, external cooling air is sucked into the second exhaust duct 27 from the intake ports 32 of the bottom wall 2e of the outer housing 2 while second exhaust hot wind 42 of heat generated by the setting power supply circuit board 13 and the light source section power supply circuit board 14 in the second exhaust duct 27 is compulsorily exhausted to the outside from the second exhaust port 16 of the front wall 2a of the outer housing 2 through the second auxiliary exhaust duct 28. Thereupon, since the second exhaust duct 27 has a good fluidity as described hereinabove, the hot wind exhausting efficiency is high, and large size heat generating parts such as the setting power supply circuit board 13 and the light source section power supply circuit board 14 can be compulsorily cooled efficiently with air.

Now, an exhaust hot wind guiding action by the first and second baffles 24 and 30 which form wind guiding means of the first and second exhaust mechanisms 21 and 26, respectively, is described.

As seen in FIG. 1, the liquid crystal projector 1 exhausts first exhaust hot wind 41 of heat of a high temperature generated by the light source section 11a of the first internal heat source and second exhaust hot wind 42 of heat generated by the setting power supply circuit board 13 and the light source section power supply circuit board 14 of the second internal heat source in the forward direction of the outer housing 2 same as the image projection direction by the projection lens 12 from the first and second exhaust ports 15 and 16 of the front wall 2a of the outer housing 2 by means of the first and second exhaust fans 23 and 29 of the first and second exhaust mechanisms 21 and 26, respectively.

In this instance, if the exhausting directions of the first and second exhaust hot winds 41 and 42 exhausted in the forward direction of the outer housing 2 from the first and second exhaust ports 15 and 16 are parallel to the optical axis P2 of the projection lens 12, then particularly if a short focal length lens having a short focal length is used as the projection lens 12 and the projection angle (angle of view) θ of a projection light flux 62 of an image to be projected to the projection plane 61 such as a screen is great, then part of the first exhaust hot wind 41 or second exhaust hot wind 42 advances into part of the projection light flux 62 and produces there a non-uniform air density region in which the refractivity of the air in the projection light flux 62 exhibits a local variation. As a result, picture quality deterioration by a schlieren which causes some fluctuation, distortion or the like to appear with an image occurs with part of an image which is projected to the projection plane 61 through the non-uniform air density region.

Therefore, in the liquid crystal projector 1, as seen in FIG. 1, the first and second baffles 24 and 30 of the first and second exhaust mechanisms 21 and 26 which extend vertically and in parallel to each other are set to the inclination angle θ2 in a leftwardly and rightwardly symmetrical relationship such that they extend outwardly in an expanding fashion to the left and right sides with respect to the reference line P4 parallel to the optical axis P2 of the projection lens 12 and to the front of the outer housing 2, and besides, also the first and second exhaust ports 15 and 16 are set to the opening angle θ1 in a leftwardly and rightwardly symmetrical relationship to the opposite left and right sides with respect to the reference plane P3 perpendicular to the optical axis P2 of the projection lens 12.

As a result, the first and second exhaust hot winds 41 and 42 to be exhausted in the forward direction of the outer housing 2 from the first and second exhaust ports 15 and 16 can be introduced into a region outside of the projection light flux 62 in the directions indicated by arrow marks A and B which are the opposite leftward and rightward directions with respect to the projection light flux 62 to be projected to the projection plane 61 from the projection lens 12. Accordingly, picture quality deterioration by a schlieren which causes some fluctuation, distortion or the like to appear with an image occurs with part of an image which is projected to the projection plane 61 because part of the first or second exhaust hot wind 41 or 42 exhausted forwardly of the outer housing 2 from the first and second exhaust ports 15 and 16 advances into the projection light flux 62 of the projection lens 12 can be prevented, and an image of a good picture quality can always be projected to the projection plane 61.

Figure 9:
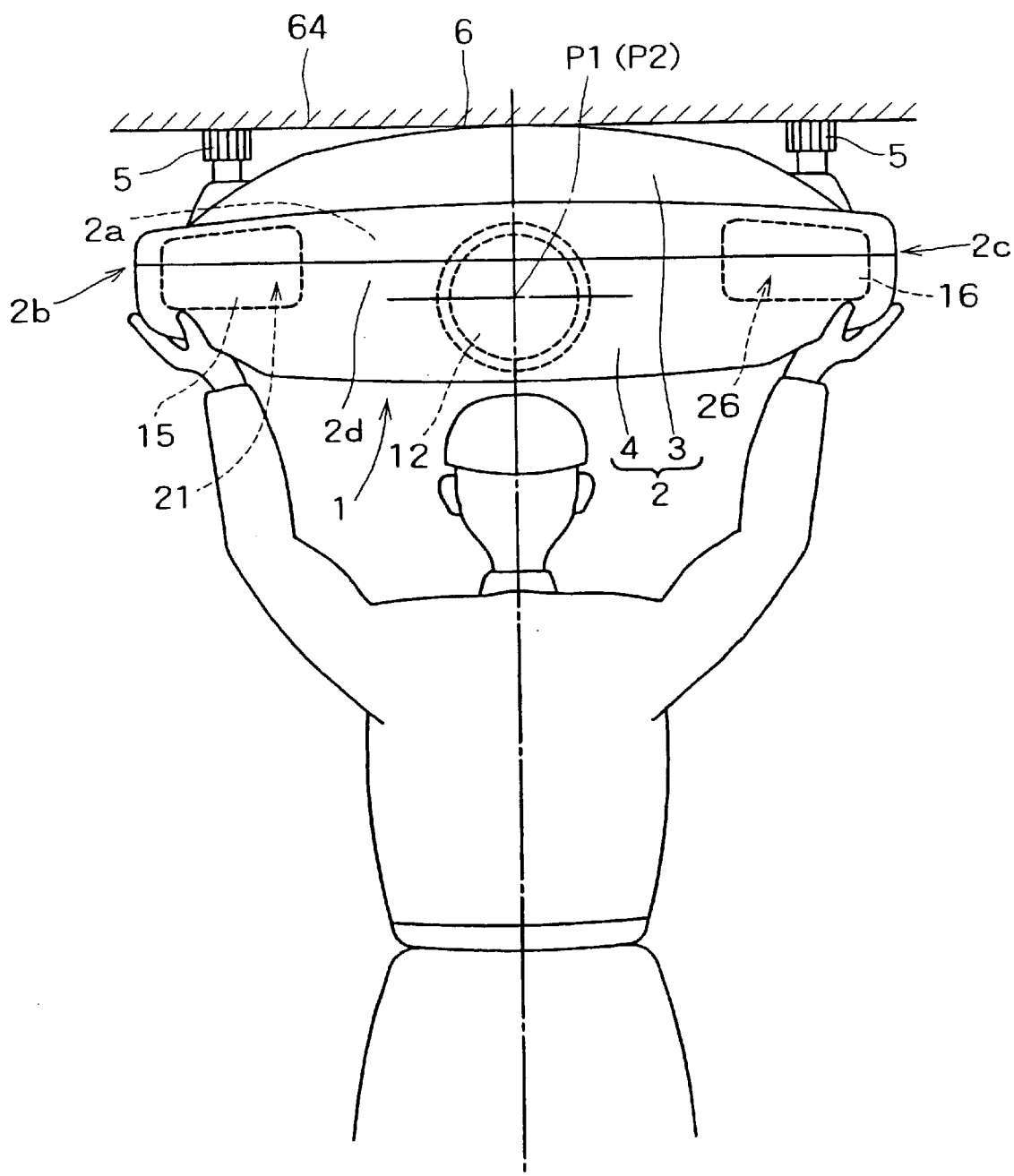
FIG. 9 is a rear elevational view illustrating an operation of attaching the liquid crystal projector of FIG. 1 to a ceiling of a house.

Now, an operation of hanging the liquid crystal projector 1 onto a ceiling 64 of a house is described with reference to FIG. 9. As described hereinabove, the liquid crystal projector 1 is configured such that the optical axis P2 of the projection lens 12 is disposed on the center P1 in the leftward and rightward direction of the outer housing 2 and the first and second exhaust ports 15 and 16 and the first and second exhaust mechanisms 21 and 26 are disposed in a leftwardly and rightwardly substantially symmetrical relationship at the opposite left and right positions of the center P1 of the outer housing 2 and besides the projection lens and the optical unit for color separation and synthesis which have weights at a comparatively high ratio in the entire projection type display apparatus are positioned at a central location. Therefore, the liquid crystal projector 1 can be balanced in weight readily in the leftward and rightward widthwise direction. Accordingly, when the operator holds the liquid crystal projector 1 high with upside down above the head with both hands and then hangs the liquid crystal projector 1 on the ceiling 64 using hanger metal members not shown, the liquid crystal projector 1 is less liable to be inclined in the leftward and rightward direction. Further, when the operator tries to hold the liquid crystal projector 1 high above the head with both hands to attach the liquid crystal projector 1 to the ceiling 64, since the liquid crystal projector 1 can be balanced readily in weight in the leftward and rightward direction, such an accident as falling down or dropping of the liquid crystal projector 1 as a result of loss of the balance can be prevented. Consequently, the hanging operation of the liquid crystal projector 1 on the ceiling 64 can be performed in safe.

Besides, when the operator holds the liquid crystal projector 1 high above the head with both hands in order to hang the liquid crystal projector 1 on the ceiling 64, the projection lens 12 can be positioned readily above the head of the operator. Consequently, the operator can position the projection lens 12 at the center of the projection plane 61 such as a screen provided on a wall or the like with reference to the position of the head of the operator itself. Consequently, the operability in the hanging operation of the liquid crystal projector 1 on the ceiling 64 can be improved significantly.

Figure 10:
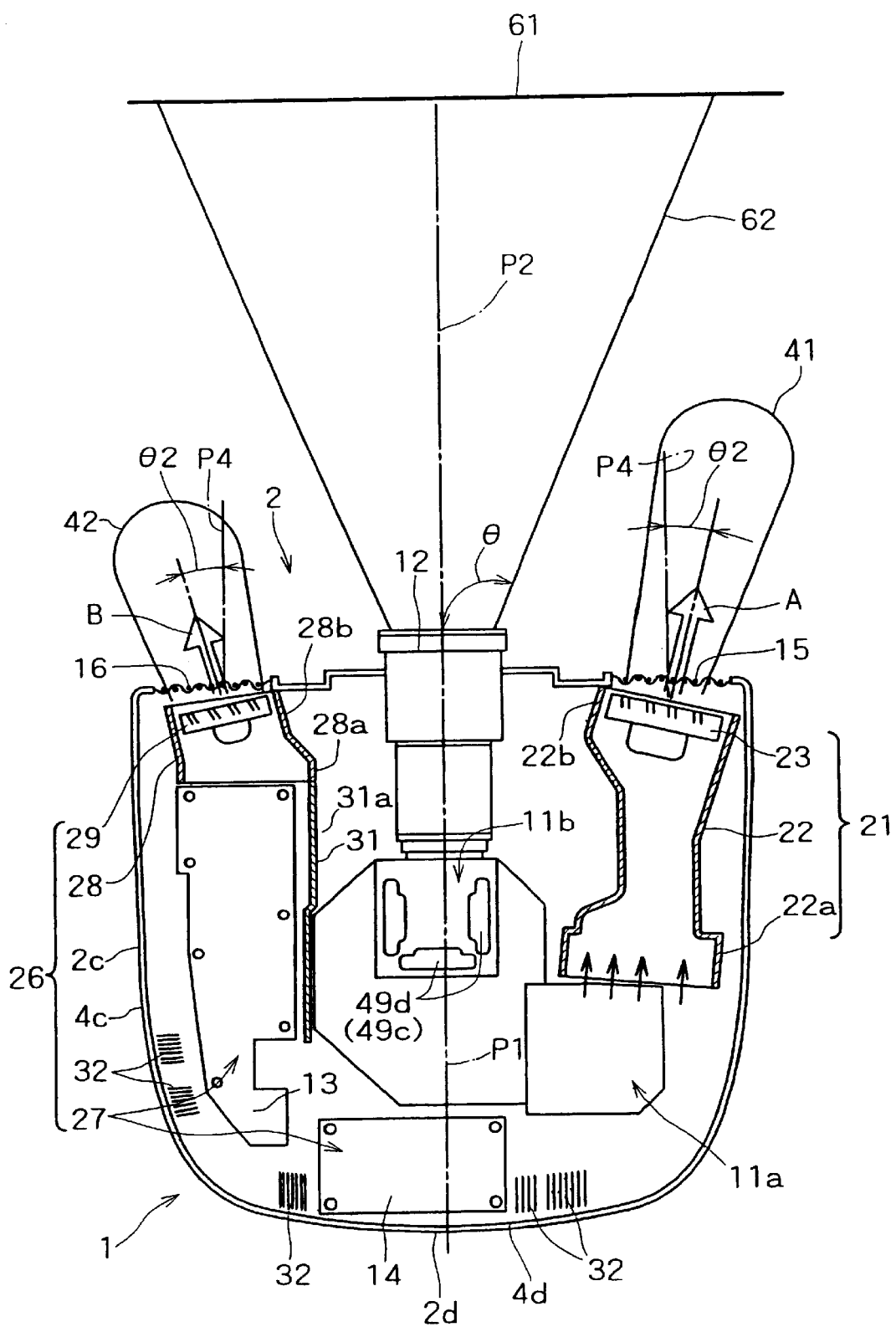
FIGS. 10 to 14 are plan views, partly in section, showing different modifications to the liquid crystal projector of FIG. 1.

Now, several modifications to the liquid crystal projector 1 are successively described with reference to FIGS. 10 to 14. First, the first modification to the liquid crystal projector 1 shown in FIG. 10 is configured such that the first and second exhaust fans 23 and 29 which are wind guiding means of the first and second exhaust mechanisms 21 and 26 are disposed in the intake side end portion 22b of the first exhaust duct 22 and the exhaust side end portion 28b of the second auxiliary exhaust duct 28, respectively, and the directions indicated by arrow marks A and B which are exhausting directions of the first exhaust fan 23 and 29 are set to an inclination angle θ2 of a leftwardly and rightwardly symmetrical configuration such that they extend outwardly in an expanding fashion to the left and right sides with respect to the reference line P4 parallel to the optical axis P2 of the projection lens 12 and to the front of the outer housing 2.

As a result, the first and second exhaust hot winds 41 and 42 to be exhausted in the forward direction of the outer housing 2 from the first and second exhaust ports 15 and 16 by the first and second exhaust fans 23 and 39 can be exhausted in a leftwardly and rightwardly symmetrical relationship in the directions of the arrow marks A and B, that is, to the opposite left and right sides of the projection light flux 62 of an image to be projected to the projection plane 61 from the projection lens 12. Accordingly, picture quality deterioration by some fluctuation, distortion or the like to appear with an image occurs with part of an image which is projected to the projection plane 61 because part of the first or second exhaust hot wind 41 or 42 advances into the projection light flux 62 of the projection lens 12 can be prevented.

Otherwise, only the exhaust hot wind 41 from the light source section 11a whose exhaust air has a higher temperature than that of the exhaust hot wind 42 from the power supply section may be inclined by the inclination angle θ2 in the exhausting direction A of the first exhaust fan 23 so that it may not advance into the projection light flux 62.

Figure 11:
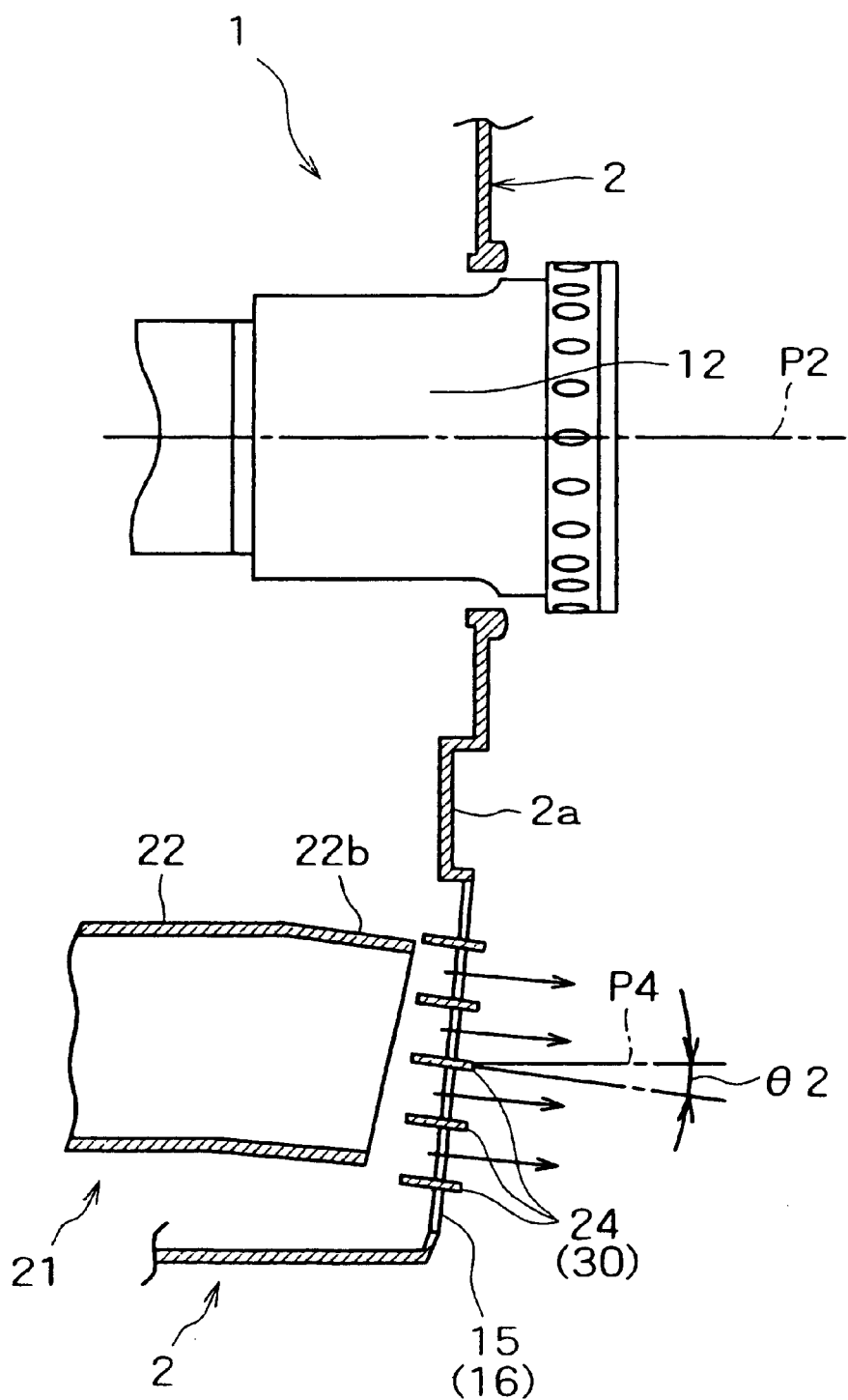

Referring now to FIG. 11, the second modification to the liquid crystal projector 1 is configured such that, while only the first exhaust port 15 is shown but the second exhaust port 16 is omitted in FIG. 11, the first and second baffles 24 and 30 extending vertically and in parallel to each other and serving as wind guiding means are molded in the first and second exhaust ports 15 and 16 as unitary members with and on the front face of the outer housing 2 molded from a heat resisting synthetic resin material or the like and the first and second baffles 24 and 30 are set to an inclination angle θ2 of a leftwardly and rightwardly symmetrical configuration such that they extend outwardly in an expanding fashion to the left and right sides with respect to the reference line P4 parallel to the optical axis P2 of the projection lens 12 and to the front of the outer housing 2. With the second modification, similar advantages to those of the embodiment described hereinabove can be anticipated.

Figure 12:
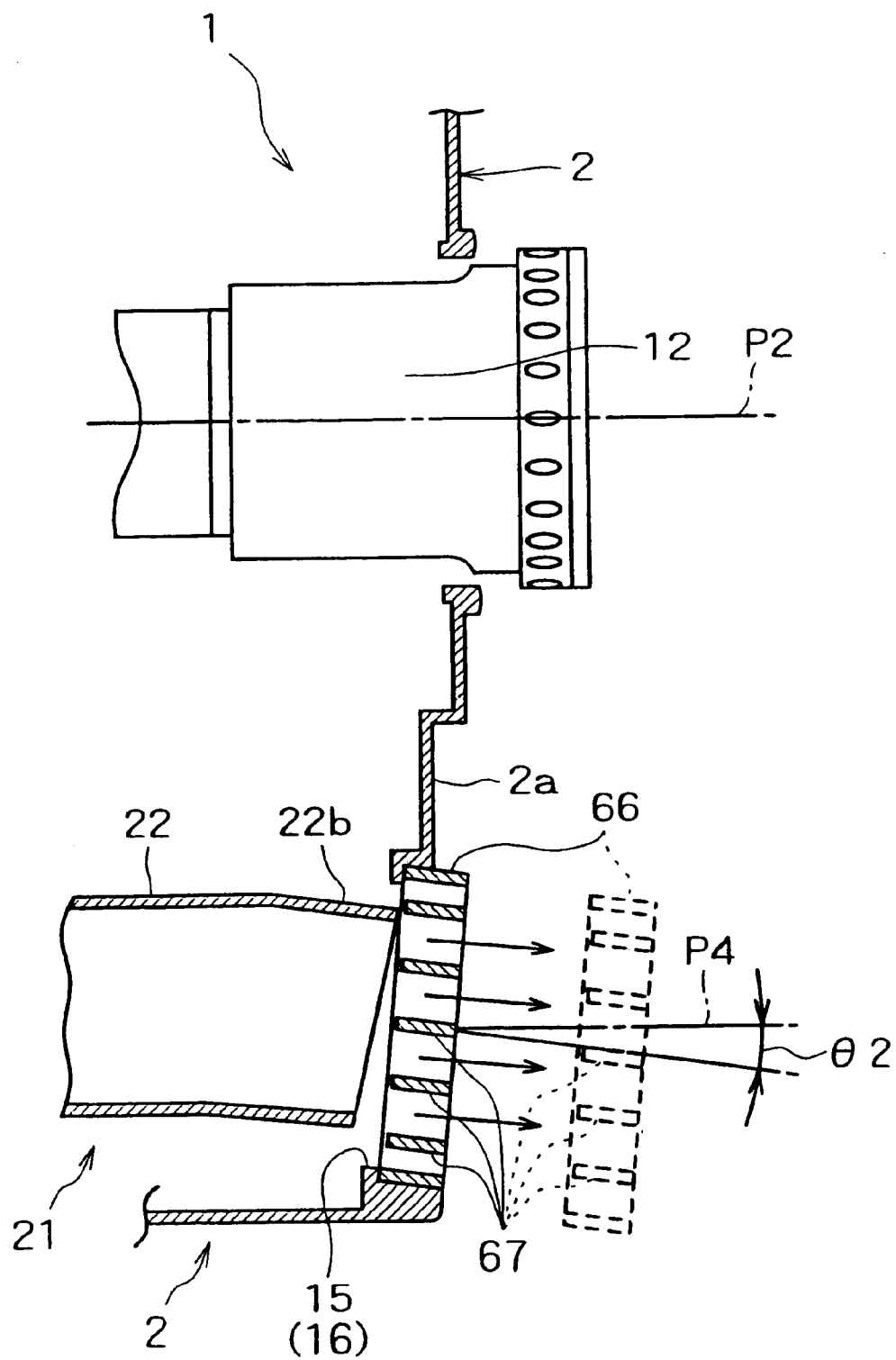

Referring now to FIG. 12, the third modification to the liquid crystal projector 1 is configured such that, while only the first exhaust port 15 is shown but the second exhaust port 16 is omitted in FIG. 12, a plurality of baffles 67 extending vertically and in parallel to each other and serving as wind guiding means are molded integrally in each of front wall grills 66 molded from a heat resisting synthetic resin material and the front wall grills 66 are removably mounted in a leftwardly and rightwardly symmetrical relationship in the first and second exhaust ports 15 and 16 of the front wall 2a of the outer housing 2. Further, the baffles 67 in the front wall grills 66 are set to an inclination angle θ2 of a leftwardly and rightwardly symmetrical configuration such that they extend outwardly in an expanding fashion to the left and right sides with respect to the reference line P4 parallel to the optical axis P2 of the projection lens 12 and to the front of the outer housing 2. With the third modification, similar advantages to those of the second modification described hereinabove can be anticipated.

Figure 13:
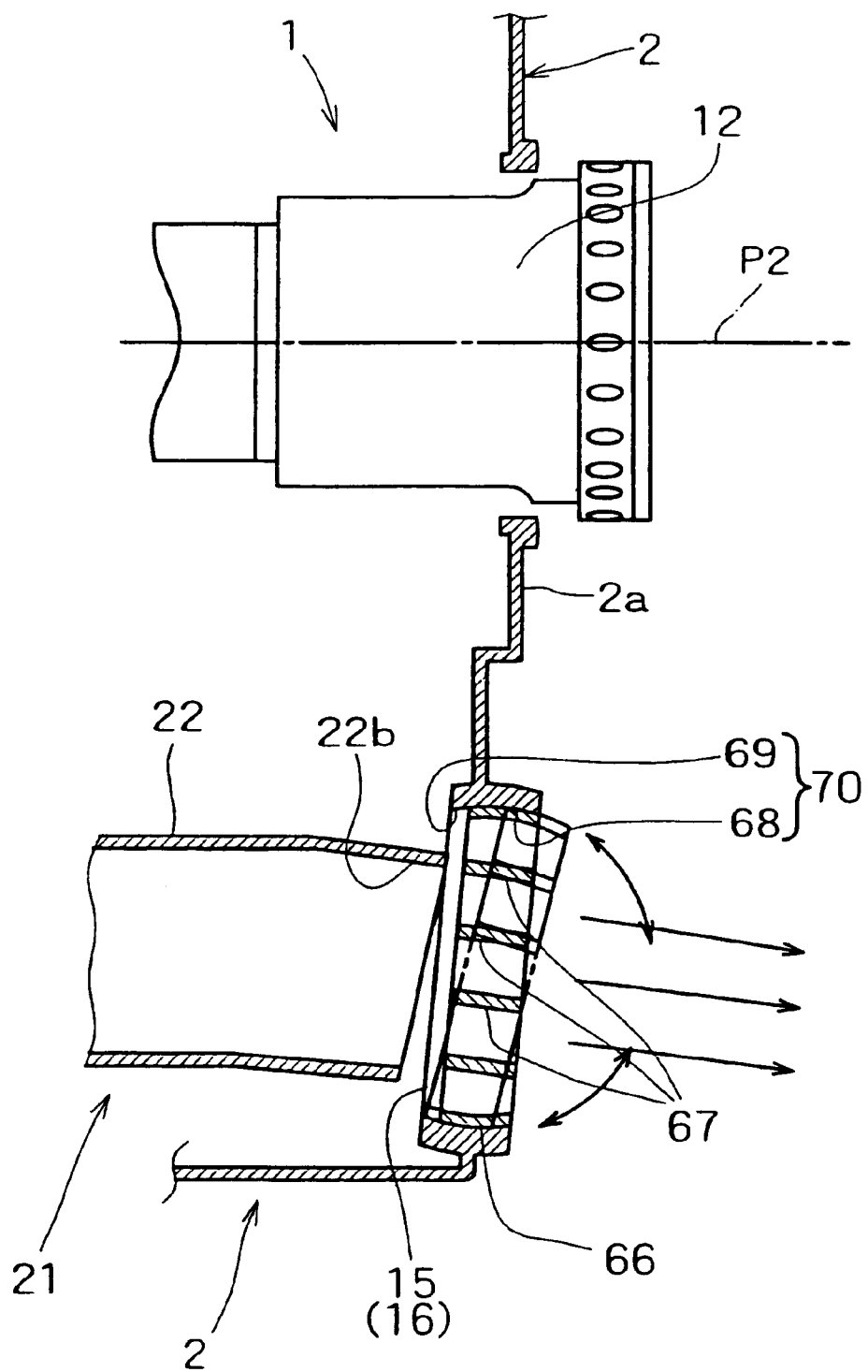

Referring now to FIG. 13, the fourth modification to the liquid crystal projector 1 includes an inclination angle adjustment mechanism 70 for the baffles 67 configured such that, while only the first exhaust port 15 is shown but the second exhaust port 16 is omitted in FIG. 13, a partial spherical face 68 of a shape obtained by cutting part of a spherical face is formed on an outer peripheral face of each of the front wall grills 66 described hereinabove in connection with the third modification with reference to FIG. 12 and the partial spherical face 68 on the outer periphery of each of the front wall grills 66 is supported for sliding motion on a partial spherical face 69 formed on an inner circumferential face of each of the first and second exhaust ports 15 and 16 of the front wall 2a of the outer housing 2 so that the inclination angle of the baffles 67 can be adjusted freely. In particular, in this instance, the front wall grill 66 can be rotatably adjusted in two circumferential directions perpendicular to each other around the center of the partial spherical face 69, and the inclination direction of the baffles 67 can be adjusted freely in any direction over 360° by rotational adjustment of the front wall grill 66.

Figure 14:
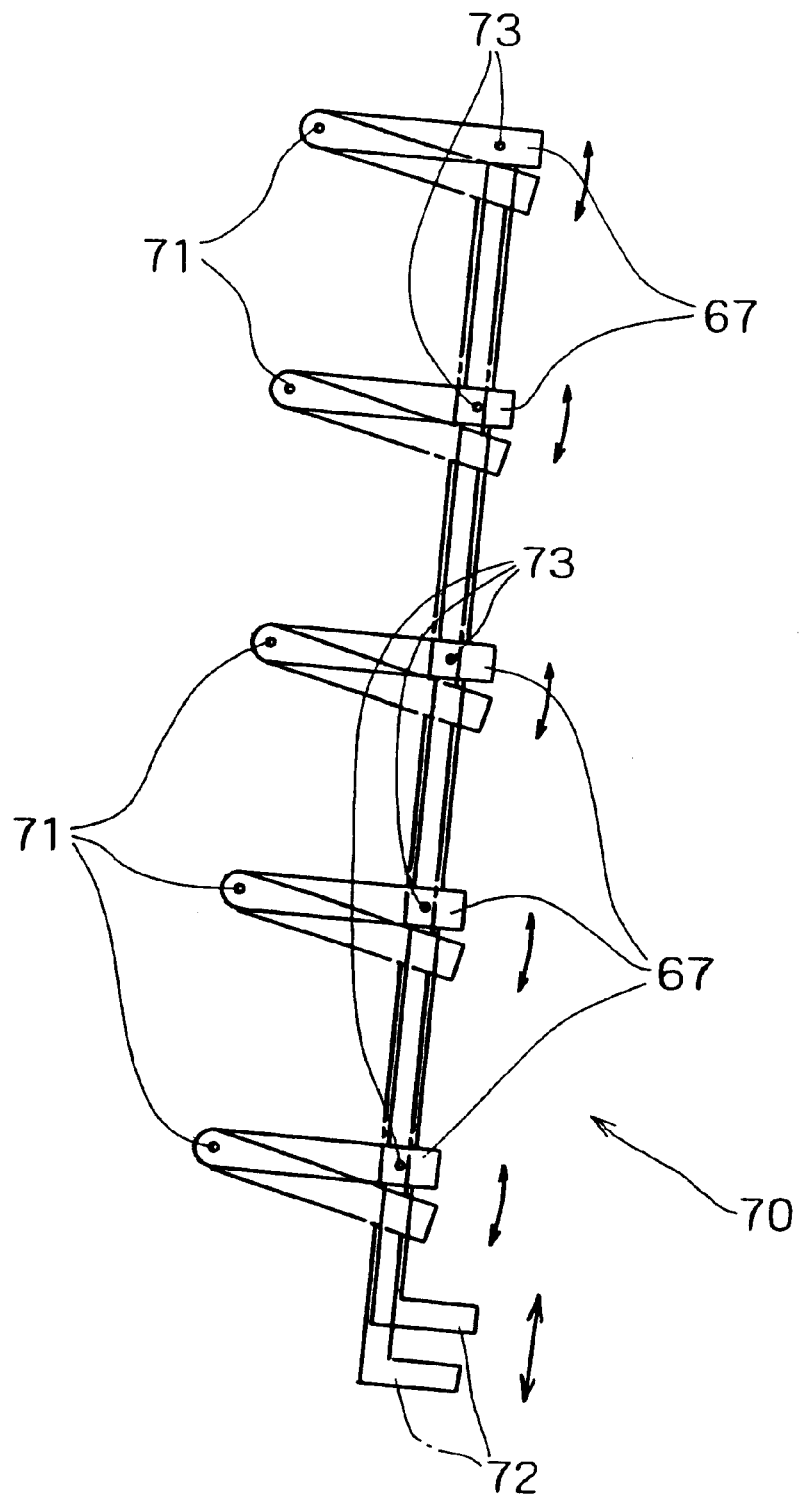
Figure 15:
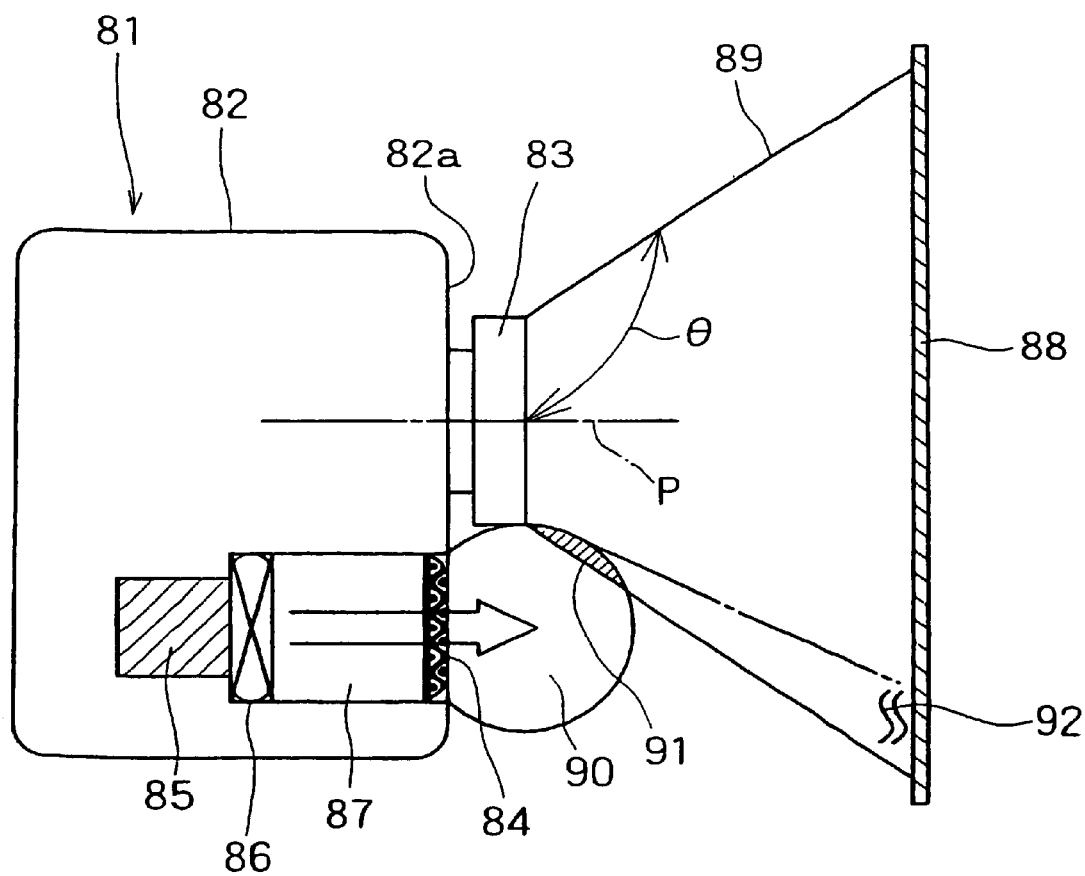
FIG. 15 is a plan view, partly in section, of a conventional liquid crystal projector.
Figure 16:
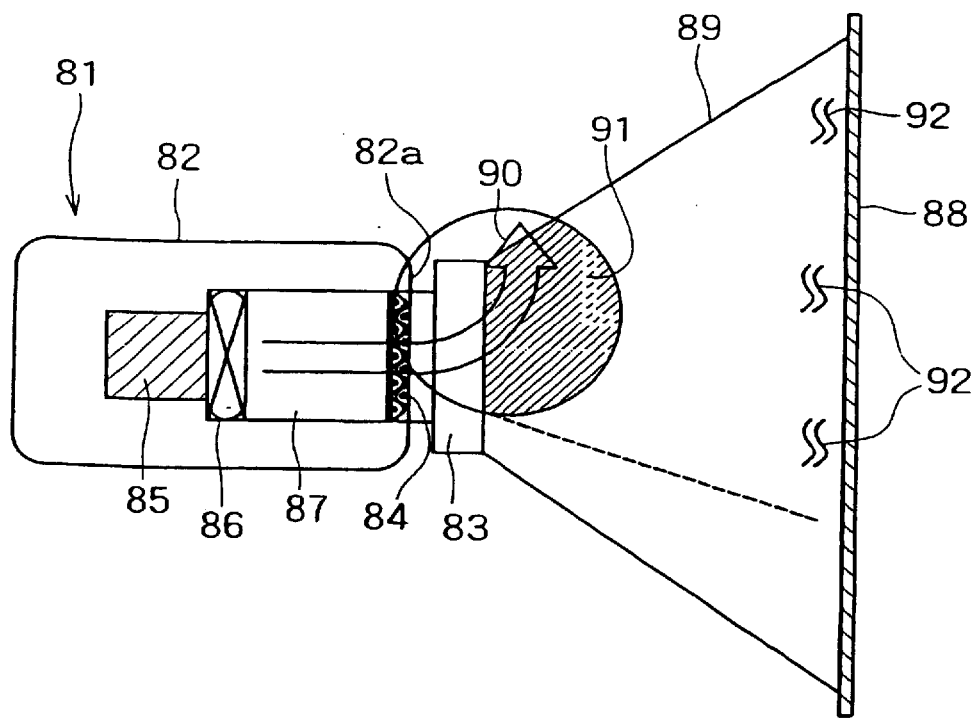
FIG. 16 is a side view, partly in section, of a conventional liquid crystal projector.
Figure 17:
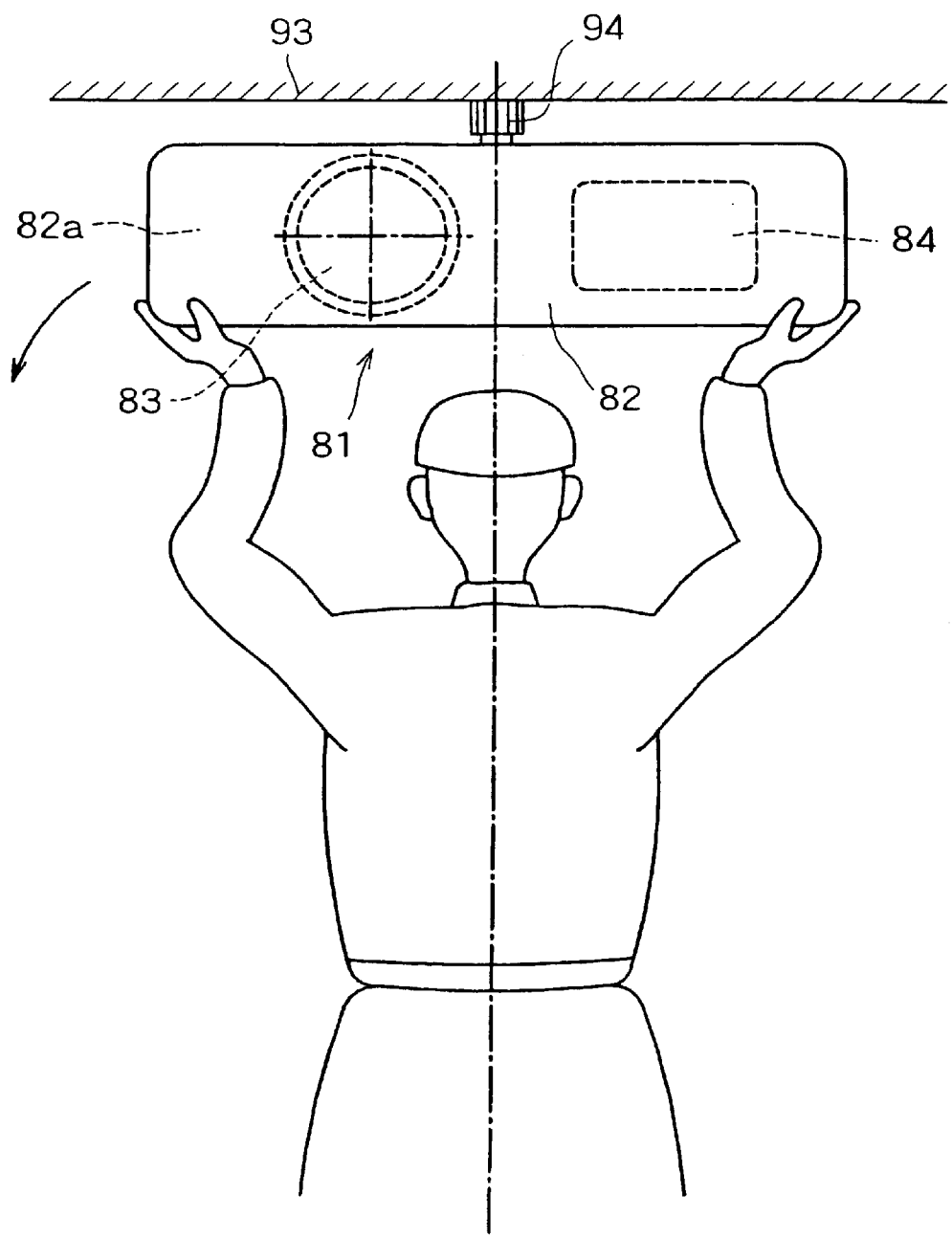
FIG. 17 is a rear elevational view illustrating an operation of attaching the liquid crystal projector of FIG. 15 to a ceiling of a house.

Referring now to FIG. 14, the fifth modification to the liquid crystal projector 1 includes another example of the inclination angle adjustment mechanism 70 for the baffles 67 described above with reference to FIG. 13. In particular, each of the baffles 67 extending vertically and in parallel to each other is supported at one end thereof for pivotal motion by means of a fulcrum pin 71 while a single angle adjusting link 72 is connected for mutual turning motion to the other ends of the baffles 67 by means of a plurality connection pins 73 such that, when the angle adjusting link 72 is operated to slidably move in its lengthwise direction, the baffles 67 are pivoted simultaneously around the respective fulcrum pins 71 so that the inclination angle of the baffles 67 can be adjusted freely.

While the present invention has been described with reference to a specific embodiment chosen for purpose of illustration, it should be apparent that numeral modifications could be made thereto by those skilled in the art without departing from the basic concept and scope of the invention.

What is claimed is:

1. A projection type display apparatus, comprising:

an outer housing;

first and second internal heat sources accommodated in said outer housing and operable to generate heat at different temperatures from each other;

first and second exhaust mechanisms including first and second exhaust fans for respectively cooling said first and second internal heat sources independently of each other with air;

a projection lens provided on a front wall of said outer housing, wherein said outer housing includes an exhaust port for radiating heat of said first and second internal heat sources located in said front wall; and wind guiding means for guiding hot wind exhausted from said exhaust port such that said hot wind does not advance into a projection light flux of an image projected from said projection lens, wherein said wind guiding means includes baffles provided in said exhaust port, and wherein an inclination direction of said baffles is adjustable.

2. The projection type image display apparatus according to claim 1, further comprising an exhaust duct disposed between said internal heat source and said exhaust port, wherein said wind guiding means includes baffles provided in an inside of an end portion of said exhaust duct adjacent to said exhaust port.

3. The projection type image display apparatus according to claim 1, wherein said wind guiding means includes an exhaust fan disposed on and inner side of said exhaust port.

* * * * *